United States Patent [19]
Sakamoto et al.

[11] Patent Number: 5,771,773
[45] Date of Patent: Jun. 30, 1998

[54] BRAKE APPARATUS HAVING AN IMPROVED BRAKE FEEL

[75] Inventors: Shigeru Sakamoto, Nishikamo-gun; Yoichi Kato, Toyota; Hiroshi Isono, Susono; Yoshihide Sekiya, Toyota, all of Japan

[73] Assignee: Toyota Jidosha Kabushiki Kaisha, Toyota, Japan

[21] Appl. No.: 661,799

[22] Filed: Jun. 13, 1996

[30] Foreign Application Priority Data

Jul. 17, 1995 [JP] Japan ..................................... 7-180358

[51] Int. Cl.⁶ ....................................................... F15B 9/10
[52] U.S. Cl. ............................................. 91/369.2; 91/376 R
[58] Field of Search .................................. 91/369.1, 369.2, 91/376 R; 60/547.1

[56] References Cited

U.S. PATENT DOCUMENTS

| | | | |
|---|---|---|---|
| 4,643,075 | 2/1987 | Wagner | 91/369.2 |
| 5,146,837 | 9/1992 | Inoue | 91/369.2 |
| 5,193,344 | 3/1993 | Meynier | 91/376 R X |
| 5,201,179 | 4/1993 | Heibel et al. | 91/376 R X |
| 5,261,313 | 11/1993 | Yared | 91/369.2 X |
| 5,331,813 | 7/1994 | Heibel et a l. | 91/376 R X |
| 5,425,302 | 6/1995 | Levrai et al. | 91/369.1 |

FOREIGN PATENT DOCUMENTS

| | | |
|---|---|---|
| Y2-62-39966 | 10/1987 | Japan . |
| Y2-63-25260 | 7/1988 | Japan . |
| Y2-3-57568 | 12/1991 | Japan . |
| U-4-35962 | 3/1992 | Japan . |
| A-5-185912 | 7/1993 | Japan . |
| A-6-211115 | 8/1994 | Japan . |

Primary Examiner—Hoang Nguyen
Attorney, Agent, or Firm—Oliff & Berridge PLC

[57] ABSTRACT

A brake apparatus has a good brake operation feel provided by a combination of a link mechanism and a brake booster. The link mechanism changes a lever ratio so that the lever ratio is gradually decreased as a pedal stroke is increased after the pedal stroke reaches a predetermined point. The brake booster increases a rate of increase of an output force so that the rate of increase is increased as an input force is increased. A brake characteristic of the brake apparatus as a whole exhibits a linear relationship relative to the deceleration of the vehicle, the brake characteristic being defined as an inclination of the deceleration against the pressing force input to the link mechanism. One of the link mechanism and the brake booster may be used alone in a brake apparatus to provide their respective effect to a brake apparatus.

11 Claims, 37 Drawing Sheets

FIG. I
PRIOR ART

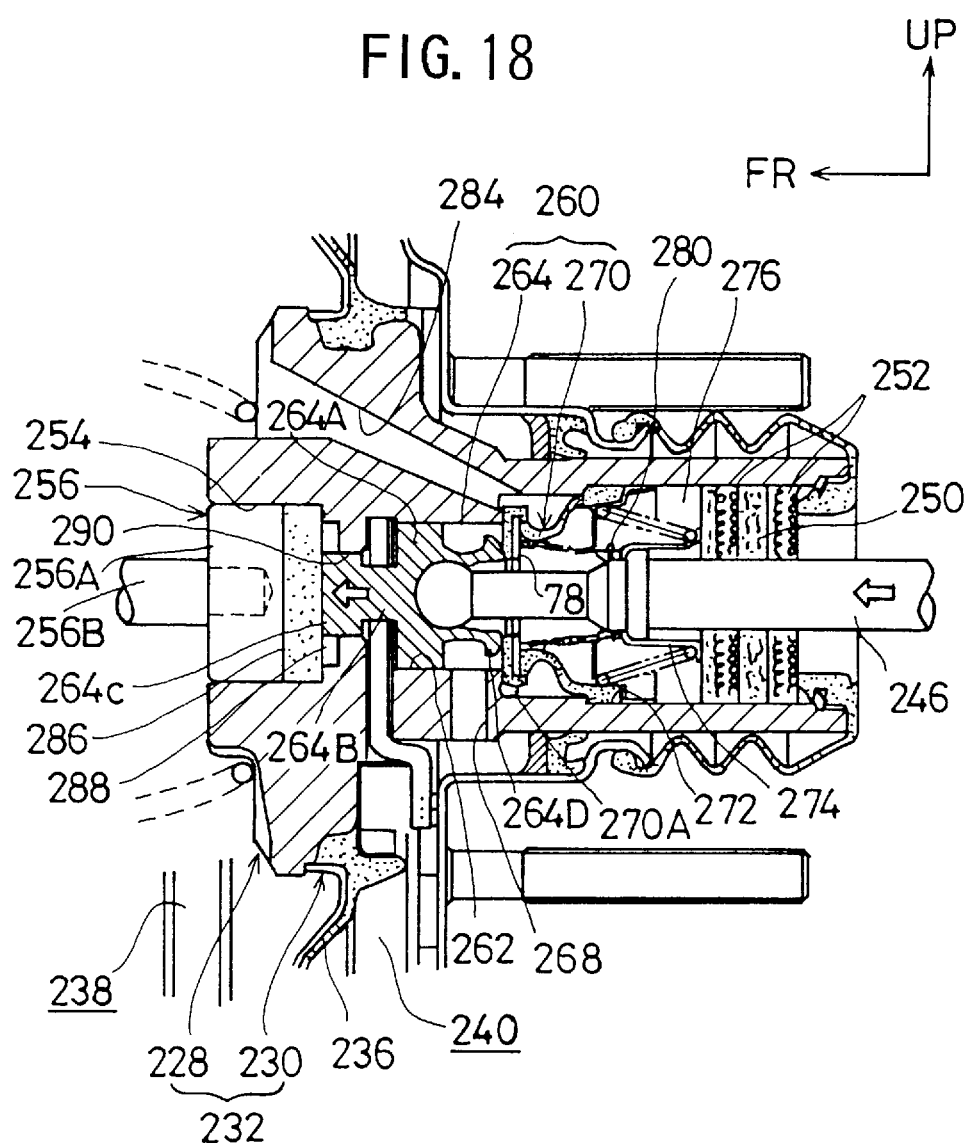
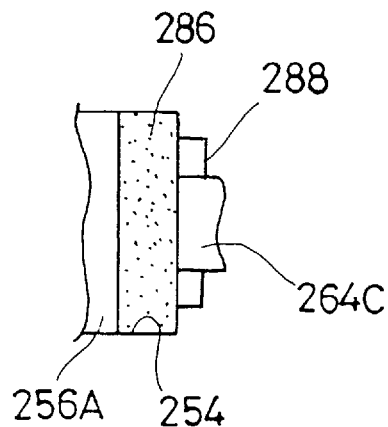

FIG.23
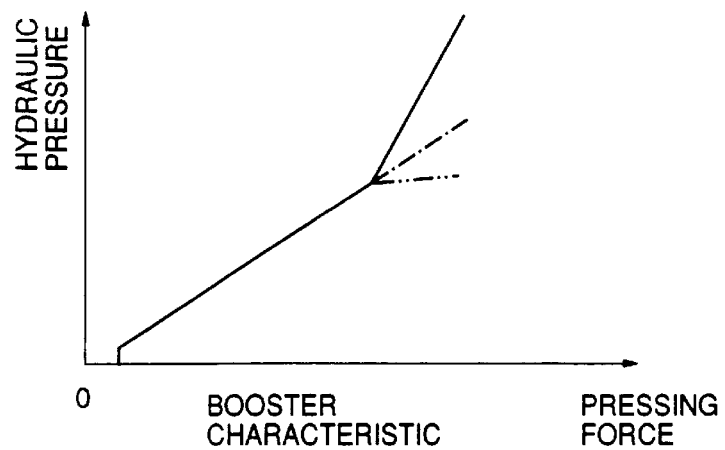
FIG.24 *PRIOR ART*
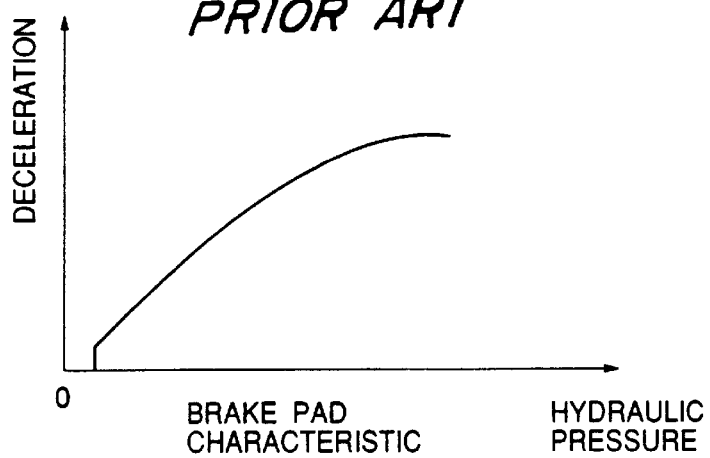
FIG.25
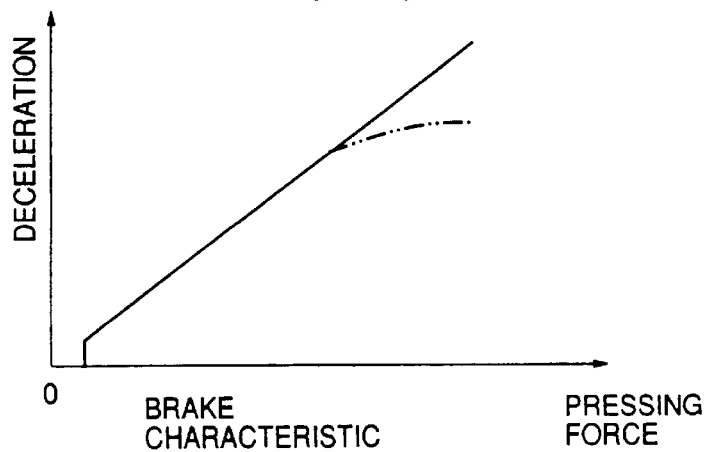

BRAKE APPARATUS HAVING AN IMPROVED BRAKE FEEL

BACKGROUND OF THE INVENTION

1. Field of the Invention

The present invention generally relates to a brake apparatus and, more particularly, to a brake apparatus having a brake pedal provided in a leg space of a vehicle to transfer a pressing force applied to the brake pedal to a master cylinder.

2. Description of the Related Art

A foot operated brake apparatus having a brake pedal for inputting a force by applying a foot press is disclosed in Japanese Laid-Open Patent Application No.6-211115. The brake apparatus disclosed therein has a function to prevent a displacement of a brake pedal when a force is applied from a frontal direction such as when the front of the vehicle is involved in an accident. In this brake apparatus, the brake pedal supported by a pedal support is connected to a master cylinder via a booster so that the master cylinder generates an appropriate hydraulic pressure in accordance with a pressing force applied to the brake pedal by an operator. The booster is provided for increasing the pressing force applied to the brake pedal. The booster and the brake support are mounted on a cowl provided above the brake pedal. More specifically, the brake support is fixed to the cowl by bolts fastened to slits formed in the cowl. The slits are elongated in a front-to-rear direction of the vehicle so that the brake support slides in the rear direction and causes downward movement of the brake pedal. This arrangement prevents transmission of a force exerted on the brake apparatus when the vehicle crushes in the front.

In this type of brake apparatus, a link mechanism is provided to transmit a force applied to the brake pedal to the master cylinder. The link mechanism comprises a brake pedal including a lever portion and a push rod as an input shaft of the master cylinder. More specifically, the brake pedal is supported by a pedal support directly under the cowl, and the push rod is connected in the middle of the lever portion of the brake. In this construction, a desired lever ratio required for the link mechanism can be easily achieved. Thus, a good brake feel can be obtained.

Accordingly, in the conventional brake apparatus, generally the pedal support is extended upwardly from a position of the booster to a dash panel. This is a reason for mounting the booster and the brake pedal on the cowl in the above-mentioned brake apparatus.

However, in the above-mentioned construction in which the brake pedal is supported under the cowl and the link mechanism is constituted by the brake pedal and the push rod, the booster must be spaced apart from the brake pedal in the front-to-rear direction of the vehicle.

When the brake apparatus is mounted on the vehicle, the position of the pedal is determined first in view of operability of the brake pedal. Positions of other component parts including the booster are determined by reference to the position of the brake pedal. Accordingly, the position of the booster is moved further toward the front of the vehicle as the distance between the booster and the brake pedal is increased. As a result, space between the booster and an engine positioned in front of the booster is reduced. This space is hereinafter referred to as a crush space. From this point of view, the above-mentioned conventional brake apparatus has a problem in that it is difficult to provide a sufficient crush space in front of the booster.

Generally, the booster is provided in a disk brake apparatus so as to increase a pressing force applied by a driver since a self servo effect cannot be obtained in the disk brake apparatus. In the booster of this type, a servo ratio is important. Japanese Laid-Open Utility Model Application No.4-35962 discloses a structure in which the servo ratio is changed during a brake applying operation.

FIG. 1 shows a booster disclosed in the above-mentioned document. As shown in FIG. 1, a power piston 108 is situated in a space formed between a front shell 100 and a rear shell 102 in a state where the power piston 108 is urged by a return spring 110. The power piston 108 comprises a valve body 104 and a diaphragm plate 106. A diaphragm 112 is provided on a back face of the diaphragm plate 106 so as to divide the space within the shells into a negative pressure chamber 114 and an atmospheric pressure chamber 116.

An operating rod 118, a plunger 120, a reaction disk 122 and a push rod 124 are provided, in that order from the rear end, along the center axis of the power piston 108. A predetermined gap is formed between the reaction disk and a pressing portion 120A formed on a front end of the plunger 120. An atmospheric pressure valve 120B is formed on the rear end of the plunger 120. A vacuum valve 130A of a poppet valve 130 is pressed by a return spring 128. An end of a negative pressure passage 132 is open in the vicinity of the vacuum valve 130A of the poppet 130. An atmospheric pressure passage 134 is formed in the vicinity of the atmospheric pressure valve 120B of the plunger 120.

Additionally, a reaction disk 122 comprises a first reaction disk 122A and a second reaction disk 122B. The first reaction disk 122A has a convex shaped cross section and is positioned on the push rod 124 side. The second reaction disk 122B has a ring shape and is positioned on the back side of the first reaction disk 122A. The hardness of the first reaction disk 122A is lower than that of the second reaction disk 122B.

In the above-mentioned structure, when a pressing force is applied to the brake pedal, a periphery of the second disk is pressed by a cylindrical portion 104A of the valve body 104. Thus, the first reaction disk 122A having a lower hardness is deformed toward the plunger 120, and contacts the pressing portion 120A of the plunger 120. Accordingly, a servo ratio at this stage is represented by tan $\Theta_1$ as shown by a line A-B in the graph of FIG. 2. When the pressing force applied to the brake pedal is increased, the second reaction disk 122B also contacts the pressing portion 120A of the plunger 120. Thus, the servo ratio at this stage is represented by tan $\Theta_2$ as shown by a line B-C in the graph of FIG. 2. When the pressing force is further increased, the servo ratio is changed to a value represented by tan $\Theta_3$ as shown by a continuing line C in the graph of FIG. 2. Accordingly, in the above-mentioned structure, the servo ratio can be changed during operation of the booster.

However, in the above-mentioned structure, the characteristic (a booster characteristic) of the booster exhibits an upwardly closed convex characteristic curve. That is, the servo ratio is decreased as the pressing force is increased. Generally, a brake pad has the same characteristic and exhibits an upwardly closed convex characteristic curve. Thus, the braking characteristics (a pressing force versus deceleration characteristic) also exhibit an upwardly closed convex characteristic curve when the two characteristics are combined. This has a disadvantage in that brake pedal operation feel deteriorates.

Japanese Laid-Open Patent Application No.5-185912 discloses a brake apparatus having a lever ratio changing mechanism provided between a brake pedal and an output member connected to a brake booster. The lever ratio changing mechanism changes a lever ratio of the entire brake pedal mechanism. More specifically, the lever ratio changing mechanism gradually increases the lever ratio as the brake pedal moves from an initial position to a start braking position, and gradually decreases the lever ratio as the brake pedal moves from the brake start position to the end of the brake pedal stroke.

Accordingly, when the brake pedal is on the way to the start braking position, that is, when the brake pedal is in an idling range (may be referred to as a first fill range), the lever ratio is small. Thus, the travel of the output member connected to the brake booster is large relative to travel of the brake pedal. This results in a completion of the first fill by a short stroke of the brake pedal. Additionally, since a change in pressing force transmitted to the brake booster per unit stroke is decreased, a fine control of deceleration can be obtained. Especially, when the brake pedal is pressed strongly, a rigid brake operation feel is achieved since the lever ratio is decreased toward the end of the brake pedal stroke. This improves the feel of a brake operation.

The above-mentioned document also teaches that it is desirable to increase a servo ratio of the brake booster so as to prevent an increase in a required pressing force to the brake pedal due to a decrease in the lever ratio in a strong braking range, that is, when the brake pedal is pressed strongly.

Thus, in the brake apparatus of the above-mentioned document, the servo ratio of the brake booster is increased when the magnitude of braking is shifted from a normal braking range to the strong braking range. This generates discontinuity in a characteristic change between a changing rate of a brake pressing force and a deceleration rate of the vehicle at a point where the pressing force is shifted between the normal braking range and the strong braking range.

The characteristic relationship between a changing rate of a brake pressing force and deceleration rate of the vehicle is equivalent to the characteristic relationship between a brake effect and the pressing force applied to the brake pedal. Accordingly, in the conventional brake apparatus, a driver has a feeling that a brake effect in the normal braking range is greatly different from that in the strong braking range. This causes a problem in that a poor braking operation feeling is conveyed to a drive.

SUMMARY OF THE INVENTION

It is a general object of the present invention to provide an improved and useful brake apparatus in which the above-mentioned problems are eliminated.

A more specific object of the present invention is to provide a brake apparatus in which a lever ratio of a brake pedal can be set to a desired ratio even when the brake lever is positioned adjacent to a brake booster.

Another object of the present invention is to provide a brake apparatus having a brake booster providing a good brake operation feeling by constructing the brake booster to have an optimum servo ratio changing characteristic.

Another object of the present invention is to provide a brake apparatus having a good brake feel operation provided by a combination of a link mechanism of a brake pedal having a lever ratio changing mechanism and a brake booster increasing a pressing force input to the link mechanism.

In order to achieve the above-mentioned objects, there is provided according to one aspect of the present invention a brake apparatus for a vehicle comprising a link mechanism and a power generating unit generating a hydraulic pressure to each wheel of the vehicle, the link mechanism comprising:

a brake pedal including a lever portion having a first end and a second end, a pedal provided on the first end, the lever portion being pivotally supported at a pivot point between the first and second ends;

a pivot link having a first end and second end, the second end of the pivot link connected to a force transmission member connected to the power generating unit, the pivot link being pivotally supported at a pivot point between the first and second ends of the pivot link; and a connection link having a first end and a second end, the first end of the connection link connected to the second end of the lever portion of the brake pedal, the second end of the connection link connected to the first end of the pivot link, wherein travel of the pedal of the brake pedal is transmitted to the force transmission member via the connection link so that a lever ratio of the link mechanism is changed while the pedal travels from an initial position to a stroke end position, the lever ratio defined as a ratio of a rate of change in movement of the pedal to a rate of change in movement of the force transmission member.

According to this invention, when a pressing force is applied to the brake pedal, the brake pedal pivots about the pivot points. Thus the pressing force is transmitted to the second end of the lever portion in accordance with the lever ratio of the lever portion. The force transmitted to the second end of the lever portion is transmitted to the pivot link via the connection link. The pivot link transmits the force to the force transmitting member by pivoting in accordance with the lever ratio of the pivot link.

The lever ratio of the link mechanism as a whole is determined by a geometrical arrangement of the brake pedal, the connection link and the pivot link. Thus, a desired lever ratio of the link mechanism can be established with a relatively high freedom of design. This provides a desired lever ratio with a relatively small distance in the front-to-rear direction between the brake pedal and the force transmitting member.

In the above-mentioned invention, the lever portion of the brake pedal may be supported by a pivot shaft mounted on a pedal support fixed to a stationary member of the vehicle, the pedal support having a first end extending to a position below the pivot shaft.

In this construction, when the pivot shaft of the brake pedal is moved rearwardly for some reason such as providing a front crush zone of the vehicle, the pedal support pivots about the first end of the pedal support. Thus, the brake pedal moves substantially downward in the vehicle. This prevents the pedal from protruding toward the interior of the passenger compartment.

Additionally, the stationary member may separate the engine compartment from the passenger compartment, the power generating unit may have a booster increasing a power input by the link mechanism, and the pedal support may have a second end opposite to the first end of the pedal support extending to a position below the pivot shaft, the second end of the pedal support fixed to the booster.

This construction permits the link mechanism being mounted to the booster together with the pedal support before the booster is mounted on the vehicle. Thus, the assembling of the brake apparatus can be simplified, and an adjustment of a position of the brake pedal can be performed before it is mounted on the vehicle.

Additionally, there is provided according to another aspect of the present invention a brake apparatus for a vehicle comprising a link mechanism and a power generating unit generating a hydraulic pressure to each wheel of the vehicle, a brake booster being provided between the link mechanism and the power generating unit to increase an input force input from the link mechanism to the power generating unit by operation of negative pressure generated in an air intake system of an engine provided in the vehicle, the brake booster comprising:

an operating rod connected to the link mechanism so that the input force is input from the link mechanism;

a push rod connected to the power generating unit to provide an output force to the power generating unit, the output force being generated by increasing the input force; and increasing means, provided between the operating rod and the push rod, for increasing a rate of increase of the output force so that the rate of increase is increased as the input force is increased.

According to this invention, since the rate of increase in the output of the booster is increased as the input force to the booster is increased, a servo ratio of the booster can be increased in a region in which effectiveness of the braking is decreased due to a normal characteristic of a brake pad. Accordingly, the relationship between the deceleration by the braking operation and the pressing force input to the brake pedal can be set to a substantially linear relationship. Thus, the brake apparatus according to this invention can provide a good brake feeling in which effectiveness of braking is not decreased during a strong braking operation.

In one embodiment of the present invention, the increasing means may comprise an elastic reaction disk engaging the push rod and a plunger engaging the operating rod, the reaction disk being pressed by an end of the plunger when the input force is supplied, a space being formed around the end of the plunger, the reaction disk protruding into the space when the reaction disk is pressed by the end of the plunger.

Accordingly, a part of the force transmitted from the operating rod to the push rod via the plunger and the reaction disk is absorbed by an elastic deformation of the reaction disk permitted in the space formed around the end of the plunger. The force is directly transmitted when the space is completely filled with the deformed reaction disk. Thus, the servo ratio is increased as the deformation of the reaction disk is increased, that is, the force input to the operating rod is increased. Accordingly, the brake apparatus according to this invention can provide a brake feeling in which effectiveness of braking is not decreased even when the brake pedal is pressed almost to the end of its stroke.

In one embodiment of the present invention, the space may be formed by a recess having a bottom surface substantially parallel to a surface of the reaction disk, the bottom surface being a predetermined distance apart from the surface of the reaction disk. In an alternative case, the space may be formed by a recess having a bottom surface having a taper extending toward the plunger.

Additionally, there is provided according to another aspect of the present invention a brake apparatus for a vehicle, comprising a link mechanism and a power generating unit generating a hydraulic pressure to each wheel of the vehicle, a pressing force being input through the link mechanism, a brake booster being provided between the link mechanism and the power generating unit to increase an input force input from the link mechanism to the power generating unit by operation of negative pressure generated in an air intake system of an engine provided in the vehicle, wherein the link mechanism comprises lever ratio changing means for changing a lever ratio of the link mechanism so that the lever ratio is gradually decreased as a pedal stroke is increased after the pedal stroke reaches a predetermined point, and the brake booster comprises increasing means for increasing a rate of increase of the output force so that the rate of increase is increased as the input force is increased, and wherein a brake characteristic of the brake apparatus is a linear relationship relative to the deceleration of the vehicle, the brake characteristic being defined as an inclination of the deceleration with respect to the pressing force input to the link mechanism.

In this invention, since the link mechanism gradually decreases the lever ratio, a change in the brake force per unit stroke of the brake pedal during a medium braking operation can be set small, resulting in a fine control of the brake force. On the other hand, during a strong braking operation, a sufficiently rigid feeling can be obtained due to a gradual decrease in the lever ratio in the medium braking region to the strong braking region.

However, according to the above-mentioned action of the link mechanism, a pressing force required during the strong braking operation is increased because the lever ratio is decreased. In this invention, this disadvantage is compensated by increasing the servo ratio of the brake by the booster having means for increasing the rate of increase of the output force especially during the strong braking operation. That is, in this invention, the link mechanism and the brake booster are appropriately combined so that a brake characteristic of the brake apparatus as a whole exhibits a constant or a linearly increasing relationship relative to the deceleration of the vehicle. This provides for an improved brake feel.

In one embodiment, the link mechanism may comprise:

a brake pedal including a lever portion having a first end and a second end, a pedal provided on the first end, the lever portion being pivotally supported at a pivot point between the first and second ends;

a pivot link having a first end and second end, the second end of the pivot link connected to a force transmission member connected to the power generating unit, the pivot link being pivotally supported at a pivot point between the first and second ends of the pivot link; and a connection link having a first end and a second end, the first end of the connection link connected to the second end of the lever portion of the brake pedal, the second end of the connection link connected to the first end of the pivot link, wherein travel of the pedal of the brake pedal is transmitted to the force transmission member via the connection link so that a lever ratio of the link mechanism is changed while the pedal travels from an initial position to a stroke end position, the lever ratio defined as a ratio of a rate of change in movement of the pedal to a rate of change in movement of the force transmission member, and the brake booster may comprise:

an operating rod connected to the link mechanism so that the input force is input from the link mechanism;

a push rod connected to the power generating unit to output the output force to the power generating unit, the output force being generated by increasing the input force; and an elastic reaction disk engaging the push rod and a plunger engaging the operating rod, the reaction disk being pressed by an end of the plunger when the input force is supplied, a space being formed around the end of the plunger, the reaction disk protruding into the space when the reaction disk is pressed by the end of the plunger, the space being formed by a recess having a bottom surface with a taper toward the plunger.

In another embodiment, the link mechanism may comprise:

a brake pedal including a lever portion having a first end and a second end, a pedal provided on the first end, the lever portion being pivotally supported at a pivot point between the first and second ends;

a pivot link having a first end and second end, the second end of the pivot link connected to a force transmission member connected to the power generating unit, the pivot link being pivotally supported at a pivot point between the first and second ends of the pivot link; and a roller rotatably supported at the first end of the pivot link, the roller engaging a surface of the lever portion of the brake pedal between the second end and the pivot point of the brake pedal, wherein travel of the pedal of the brake pedal is transmitted to the force transmission member via the roller and the pivot link so that a lever ratio of the link mechanism is changed while the pedal travels from an initial position to a stroke end position, the lever ratio defined as a ratio of a rate of change in movement of the pedal to a rate of change in movement of the force transmission member.

Additionally, the brake booster may comprise:

an operating rod connected to the link mechanism so that the input force is input from the link mechanism;

a push rod connected to the power generating unit to output the output force to the power generating unit, the output force being generated by increasing the input force: and an elastic reaction disk engaging the push rod and a plunger engaging the operating rod, the reaction disk being pressed by an end of the plunger when the input force is supplied, a space being formed around the end of the plunger, the reaction disk protruding into the space when the reaction disk is pressed by the end of the plunger, the space being formed by a recess having a bottom surface with a taper toward the plunger, the end of the plunger having a tapered surface.

In this embodiment, a desired servo ratio can be obtained by appropriately changing a taper angle of the end of the plunger.

Other objects, features and advantages of the present invention will become more apparent from the following detailed description when read in conjunction with the accompanying drawings.

BRIEF DESCRIPTION OF THE DRAWINGS

FIG. 18 is a cross sectional view of a part of the brake booster shown in FIG. 15 in a state where the pressing portion contacts the reaction disk;

FIG. 19 is an enlarged view for explaining a positional relationship between the reaction disk and the pressing portion shown in FIG. 18;

FIG. 23 is a graph representing a characteristic of the booster shown in FIG. 15;

FIG. 24 is a graph representing a characteristic of a brake pad;

FIG. 25 is a graph representing a brake characteristic;

DETAILED DESCRIPTION OF THE PREFERRED EMBODIMENTS

Figure 1:
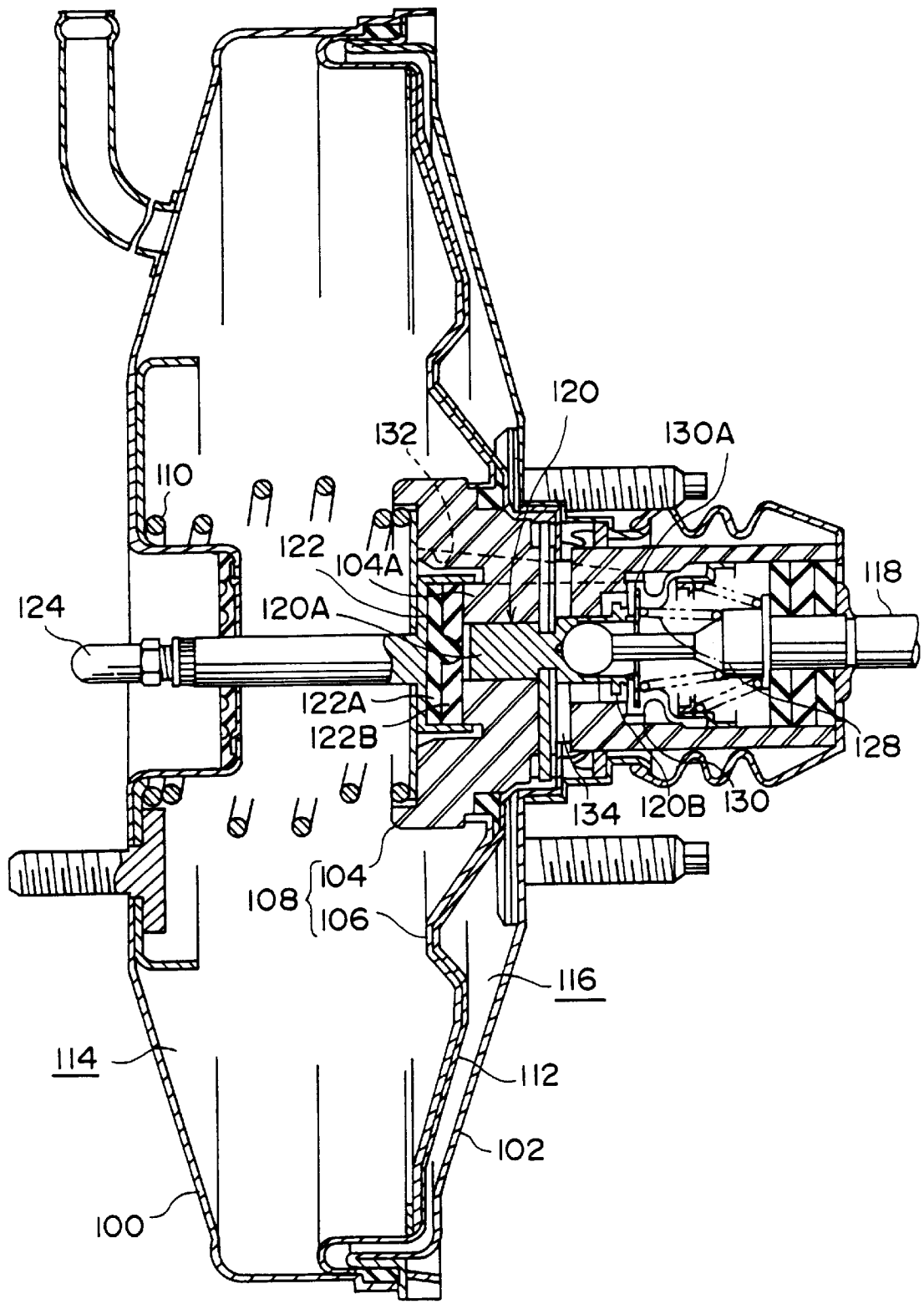
FIG. 1 is a cross-sectional view of a conventional brake booster.
Figure 2:
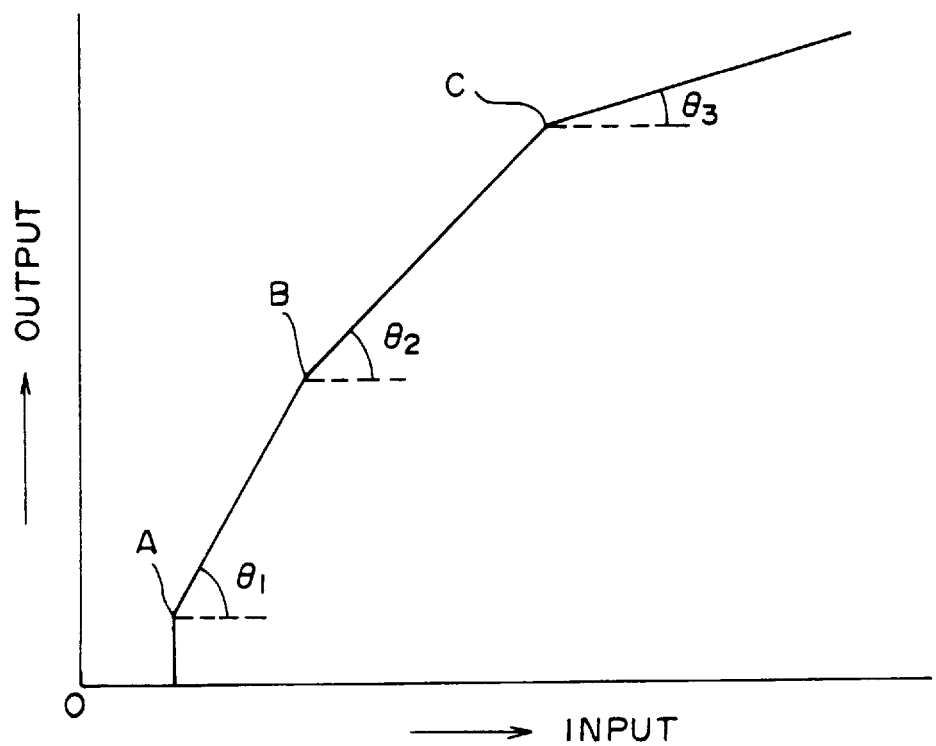
FIG. 2 is a graph showing a characteristic of the brake booster shown in FIG. 1.
Figure 3:
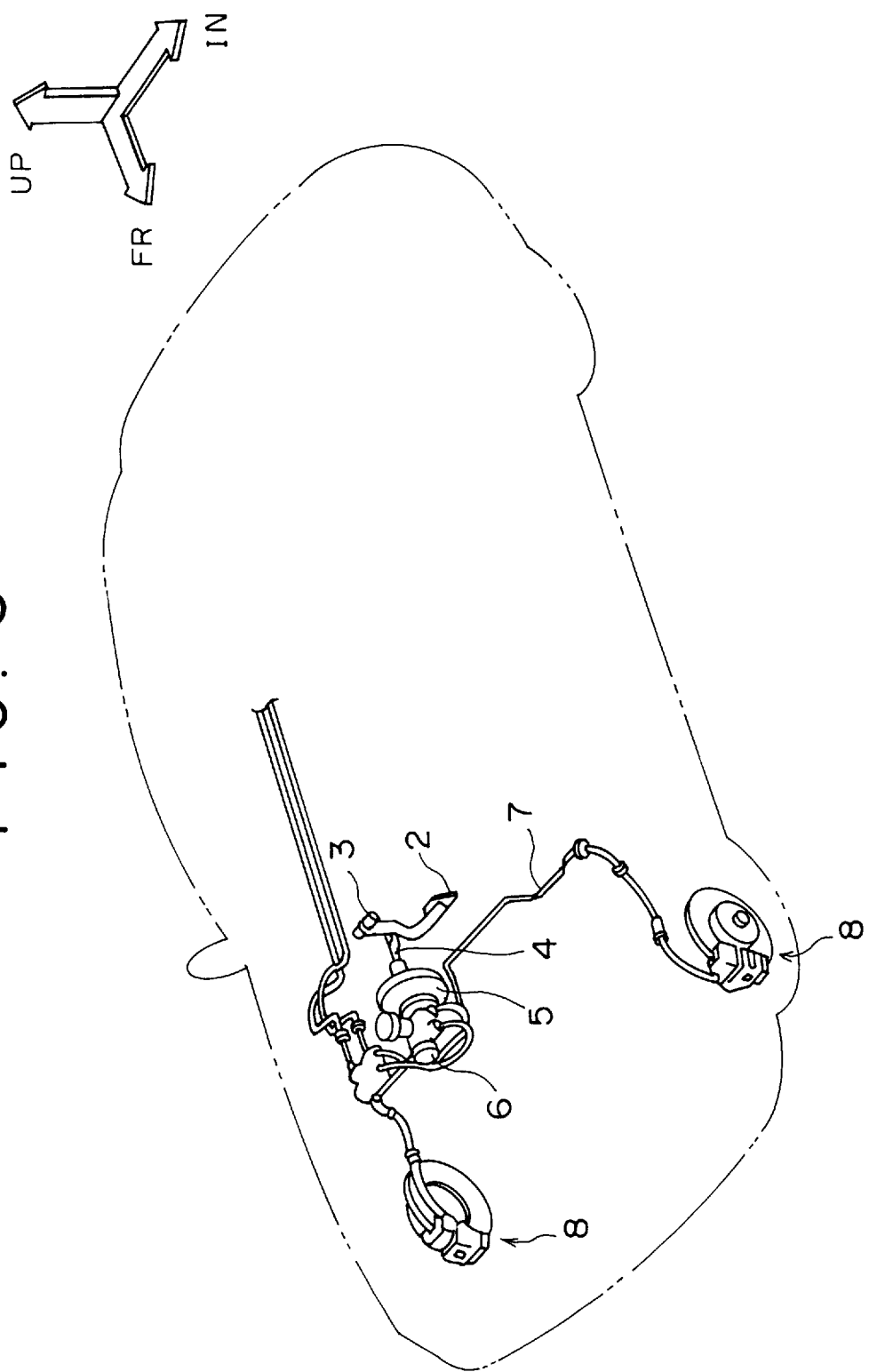
FIG. 3 is an illustration of an entire brake system of a vehicle.

FIG. 3 is an illustration showing an entire brake system provided in a vehicle to which the present invention is related. The brake system generally comprises a brake pedal 2 supported by a brake support shaft 3, a brake booster 5, a master cylinder 6 and disk brakes or drum brakes 8 provided for each wheel of a vehicle. The brake pedal 2 is connected to the brake booster 5 via a push rod 4. A pressing force applied to the brake pedal 2 is transmitted to the master cylinder 6 via the push rod 4 and the brake booster 5. The master cylinder 6 generates a hydraulic pressure correspondingly in response to the pressing force and supplies the hydraulic pressure to a cylinder of each disk brake or drum brake 8 via a respective brake pipe or line 7. It should be noted that, in the figure, an arrow UP indicates a vertically upward direction of the vehicle; an arrow FR indicates a front direction of the vehicle; an arrow IN indicates a side-to-side direction of the vehicle.

Figure 4:
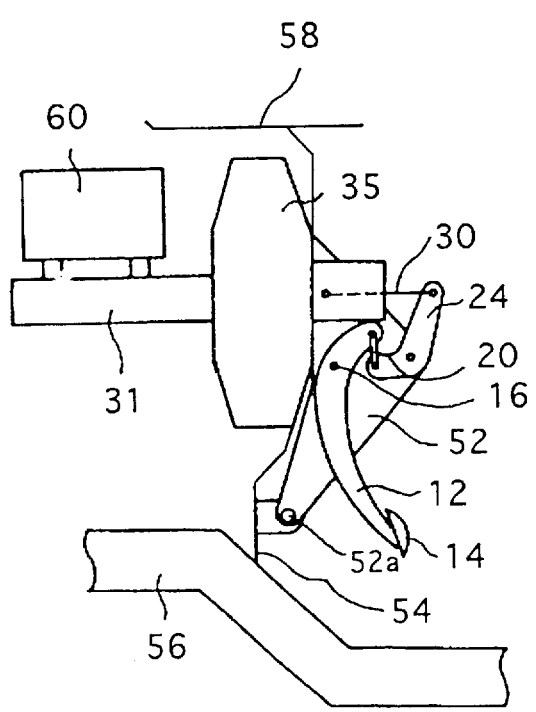
FIG. 4 is an illustration of an entire brake apparatus according to a first embodiment of the present invention.
Figure 5:
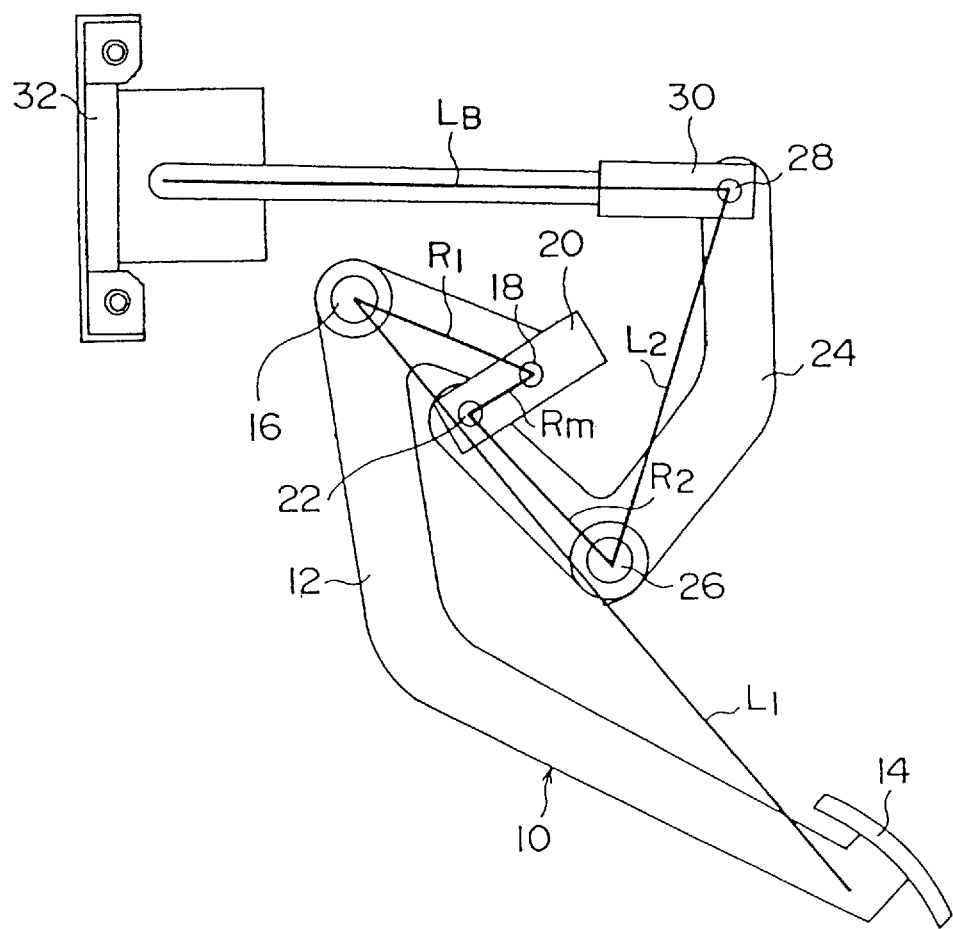
FIG. 5 is an enlarged view of a link mechanism of the brake apparatus shown in FIG. 4.

A description will now be given of a first embodiment of the present invention. FIG. 4 is an illustration of an entire brake apparatus according to the first embodiment of the present invention. FIG. 5 is an enlarged view of a link mechanism of the brake apparatus shown in FIG. 4.

As shown in FIG. 5 a brake pedal 10 comprises a lever portion 12 and a pedal 14 provided on an end of the lever portion 12. The lever portion 12 is pivotally supported in the middle thereof by a pivot support 16. The other end of the lever portion 12 is pivotally connected to a connection link 20 via a connection 18.

The connection link 20 is pivotally connected to an end of a pivot link 24 via a connection 22. The pivot link 24 is pivotally supported in the middle thereof by a pivot shaft 26. The other end of the pivot link 24 is pivotally connected to a push rod 30 via a connection 28 which transmits a force applied to the pedal 14.

The push rod 30 functions as an input shaft of a booster 32. The booster 32 boosts and transmits the foot pressure force applied to the pedal 14 to a master cylinder 31 (refer to FIG. 4) which generates a hydraulic pressure supplied to a brake unit of each wheel. The push rod 30 travels within a predetermined stroke.

Accordingly, in the brake apparatus according to the first embodiment of the present invention, a travel of the push rod 30 corresponding to a displacement of the push rod 30 in an axial direction of the booster 32 and a thrust force corresponding to a component of an external force in the axial direction of the booster 32 are provided to the booster 32.

In the brake apparatus according to the present embodiment, the lever portion 12 of the brake pedal 10 and the pivot link 24 are bent as shown in FIG. 5 so as to prevent an interference between the brake pedal 10, the connection link 20 and the pivot link 24 and to make the entire configuration compact. When they are simplified for a link mechanism model, they are equivalent to members indicated by solid lines L1, R1, Rm, R2, and L2. That is, the brake pedal 10 corresponds to a combination of the lines L1 and R1. The connection link 20 corresponds to the line Rm. The pivot link 24 corresponds to a combination of the lines R2 and L2. Additionally, the push rod 30 is equivalent to a member indicated by a solid line LB.

When an analysis is made as to how the pressing force applied to the pedal 14 is transmitted to the booster 32, an angle formed between L1 and R1 and an angle between R2 and L2 may be any angles if the angles are maintained to be constant.

Figure 6:
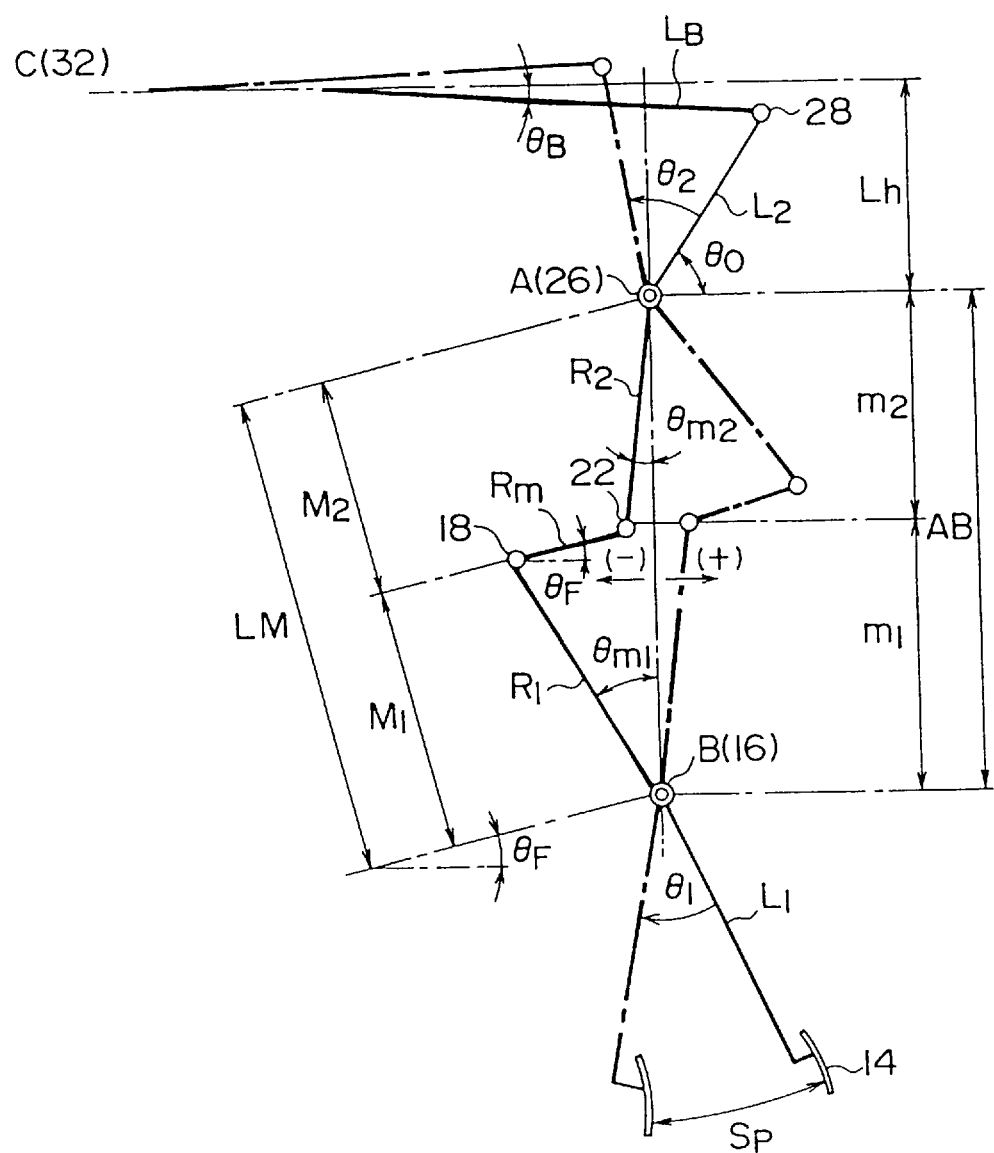
FIG. 6 is a link model of the link mechanism shown in FIG. 5.

Accordingly, the link mechanism shown in FIG. 5 can be simply represented by an analysis model shown in FIG. 6. That is, in the analysis model shown in FIG. 6, the relationship among R1 corresponding to a part of the brake pedal 10, Rm corresponding to the connection link 20 and the R2 corresponding to a part of the pivot link 24 and the relationship between L2 corresponding to a part of the pivot link 24 and LB corresponding to the push rod 30 are the same as that of the link mechanism shown in FIG. 5.

In FIG. 6, solid lines indicate an initial state where a pedal stroke $S_P$ is zero, that is, the brake pedal 14 is not pressed, and chain lines indicate a state where the brake pedal 14 is pressed.

The link mechanism shown in FIG. 5 has a characteristic in which a brake force adjustment can be easily performed by controlling a stroke in a range where the pedal stroke $S_P$ of the brake pedal 10 is small, and a brake force adjustment can be easily performed by controlling a pressing force in a range where the pedal stroke is large.

That is, in the lever mechanism according to the present embodiment, a lever ratio $R_P$ (a ratio of an input moment arm length to an effective moment arm length relative to the booster 32) is large in a range where the pedal stroke $S_P$ is small, and the lever ratio $R_P$ is decreased as the pedal stroke $S_P$ is increased.

In this case, in an initial stage of a braking operation, stroke speed is greatly reduced when the pedal stroke $S_P$ is converted into a stroke (hereinafter referred to as an effective stroke) $S_B$ of the push rod 30 parallel to the axial direction of the booster 32. Thereby, a characteristic having superior stroke controllability is achieved. On the other hand, in a range where the pedal 14 is sufficiently pressed, since the pedal stroke $S_P$ is converted into the effective stroke $S_B$ with less reduction, a small change in the pedal stroke $S_P$ causes a large change in the brake force. Accordingly, a superior pressing force controllability can be achieved.

Figure 7:
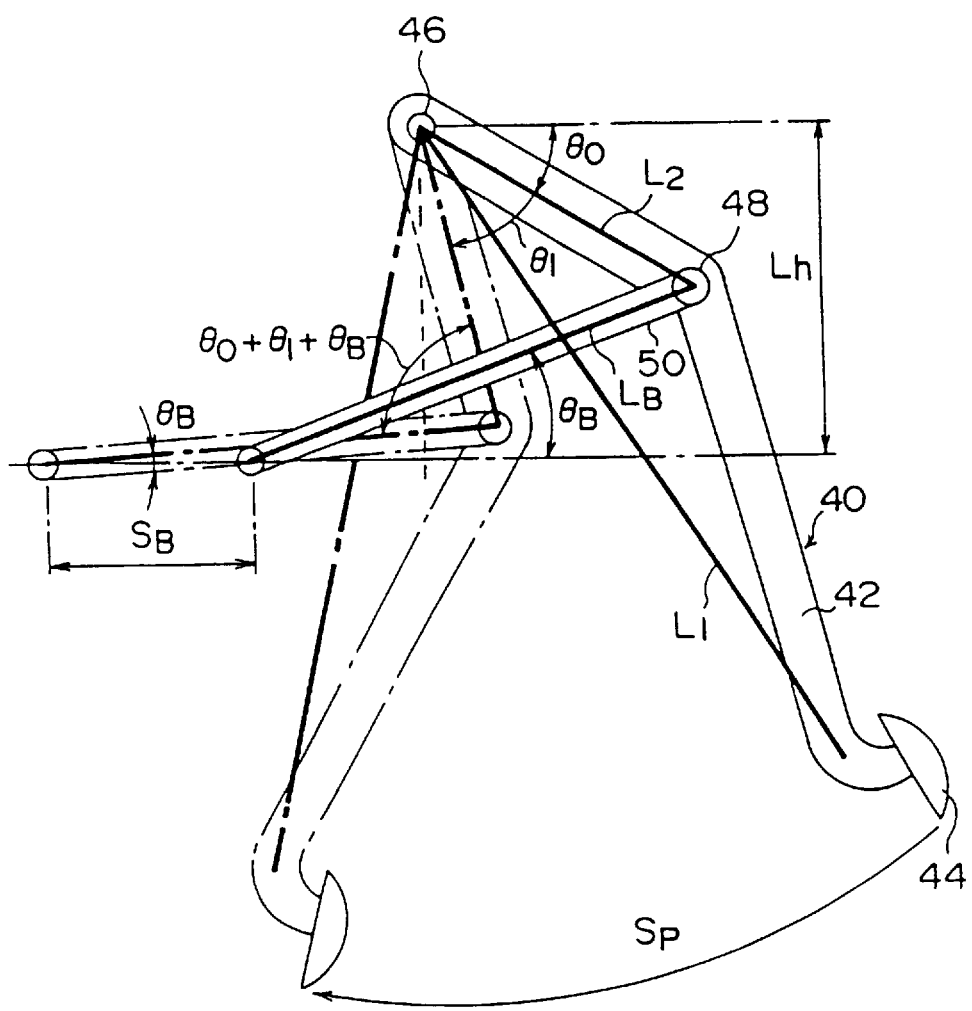
FIG. 7 is an illustration of a link mechanism.

As a mechanism for increasing the lever ratio $R_P$ when the pedal stroke $S_P$ is increased, a link mechanism shown in FIG. 7 is known conventionally. However, the link mechanism of the present invention is more suitable for a brake system of a vehicle as compared to the conventional link mechanism shown in FIG. 7 since the link mechanism according to the present invention has an ideal characteristic for a vehicle brake control.

In the link mechanism shown in FIG. 7, a brake pedal 40 comprises a lever portion 42 and a pedal 44 provided on one end of the lever portion 42. The other end of the lever portion 42 is pivotally supported by a pivot shaft 46 fixed to a vehicle body. A push rod 50 is pivotally connected in the intermediate portion of the lever portion 42 via a connection 48.

The push rod 50 constitutes an input shaft of a booster (not shown) to transmit to the booster a thrust force corresponding to a pressing force applied to the pedal 44. The push rod 50 swings in up and down directions relative to the booster. Accordingly, when the brake pedal 44 is pressed and the connection 48 is moved, an end of the push rod 50 travels with an effective stroke $S_B$ in an axial direction of the booster.

The link mechanism shown in FIG. 4 can also be represented by an analysis model similar to the link mechanism shown in FIG. 5. In this case, the brake pedal is represented by a combination of solid lines L1 and L2, and the push rod 50 is represented by a line LB. Chain lines in FIG. 7 indicate a state where the pedal 44 is traveled with a pedal stroke $S_P$.

In FIG. 7, an angle between L2 and the axial direction of the booster is indicated $\Theta_0$; an angle between LB and the axial direction of the booster is indicated by $\Theta_B$; a normal distance between the pivot shaft 46 and the axial direction of the booster is indicated by Lh; and a movable angle of L1, that is, a movable angle of the brake pedal 10 is indicated by $\Theta_1$.

When each parameter is defined as indicated in FIG. 7, a moment arm length of an input side of the link mechanism is equal to a distance between the pedal 44 and the pivot shaft 46, that is, L1. On the other hand, a moment arm length of an output side of the link mechanism is equal to a distance between the pivot shaft 46 and an intersection of L2 and a line normal to the axial direction of the booster, and is represented as a function of the angle $\Theta_B$ by $L2*\sin(\Theta_0+\Theta_1+\Theta_B)/\cos\Theta_B$.

Accordingly, the lever ratio which is a ratio of the moment arm length of the input side to the moment arm length of the output side is represented by the following equation.

$$R_P = \frac{L_1 \cos \Theta_B}{L_2 \sin(\Theta_0 + \Theta_B + \Theta_1)} \quad (1)$$

The angle $\Theta_B$ in the above equation (1) can be represented by using the initial setting value Lh, the angle $\Theta_0$ and the operation angle $\Theta_1$ as follows.

$$\Theta_B = \sin^{-1}\{(Lh - L2*\sin(\Theta_0 + \Theta_1))/L_B\} \quad (2)$$

Additionally, the operation angle $\Theta_1$ can be represented as a function of the pedal stroke $S_P$ and the length L1 as follows.

$$\Theta_1 = S_P/L1 \quad (3)$$

Accordingly, the lever ratio $R_P$ in the equation (1) can be represented as a function of the pedal stroke $S_P$ as follows.

$$R_P = \frac{L_1 \cos\left[\sin^{-1}\dfrac{Lh - L_2 \sin(\theta_0 + S_P/L_1)}{L_B}\right]}{L_2 \sin\left\{\theta_0 + S_P/L_1 + \sin^{-1}\left[\dfrac{Lh - L_2 \sin(\theta_0 + S_P/L_1)}{L_B}\right]\right\}} \quad (4)$$

The effective stroke $S_B$ which is a travel of an end of the push rod 50 can be obtained as a sum of a component of a travel of $L_B$ in the axial direction of the booster due to a change in the angle $\Theta_B$ and a component of travel of the connection 48 in the axial direction of the booster. The effective stroke $S_B$ is represented as a function of the pedal stroke as follows.

$$S_B = \sqrt{\{L_B{}^2 - (Lh - L2*\sin(\theta_0 + S_P/L1))^2\}} - \quad (5)$$

$$\sqrt{\{L_B{}^2 - (Lh - L2*\sin\theta_0)^2\}} + L2*\cos\theta_0 - \cos(\theta_0 + S_P/L1)$$

As discussed above, both of the lever ratio $R_P$ and the effective stroke $S_B$ can be represented as functions of the pedal stroke $S_P$. In order to increase a change rate of the lever ratio $R_P$ with respect to the pedal stroke $S_P$, it is effective to increase the swing angle of the push rod 50.

Figure 8:
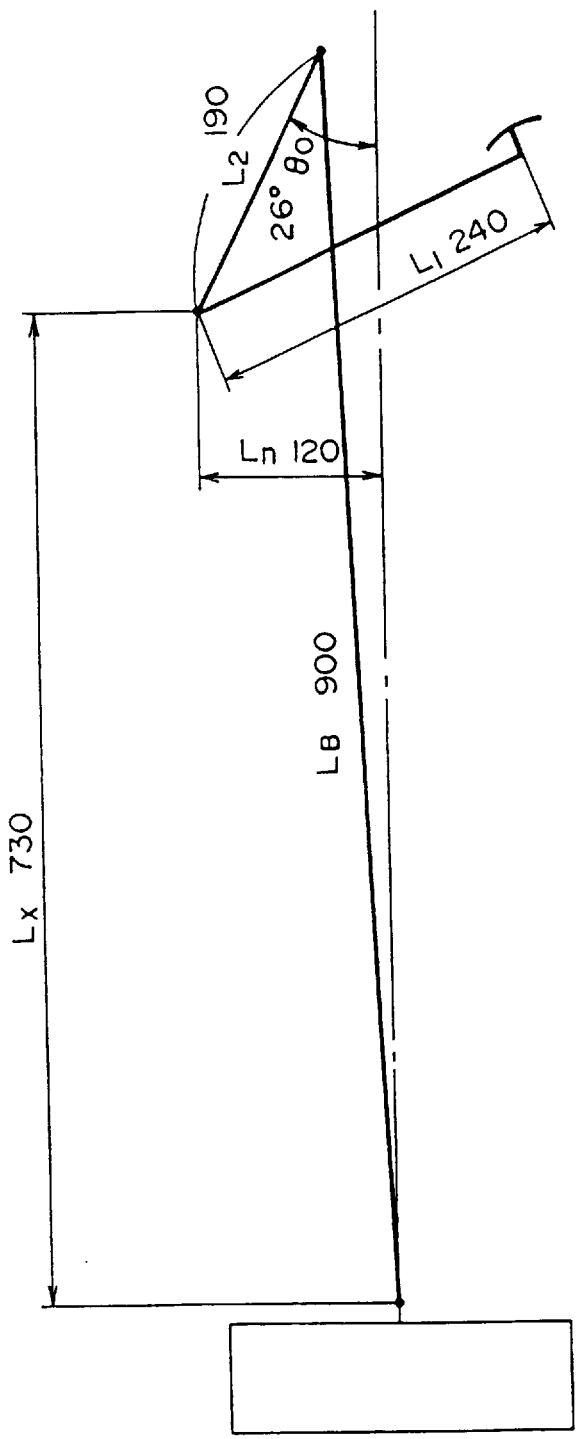
FIG. 8 is an example of a design of the link mechanism shown in FIG. 7.

However, the swing angle of the push rod 50 must be confined within an allowable range determined by the booster so that the push rod 50 does not pry the booster 50. Thus, the push rod 50 must be positioned away from the brake pedal. FIG. 8 is an example of a design of the link mechanism shown in FIG. 7 in consideration with this point.

Figure 9:
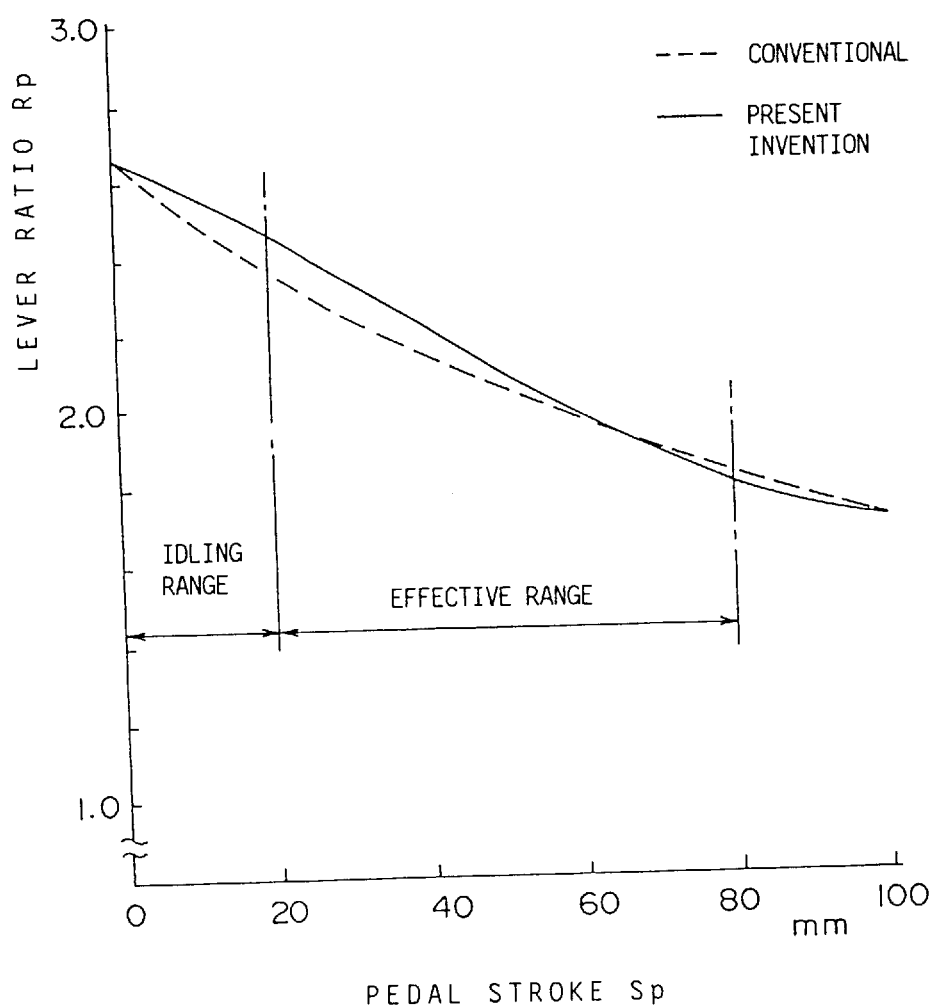
FIG. 9 is a graph showing a relationship between a pedal stroke and a lever ratio in the link mechanism shown in FIG. 7.

In this case, the relationship between the lever ratio RP and the pedal stroke $S_P$ is such that, as shown by a dashed line in a graph of FIG. 9, the lever ratio $R_P$ is decreased as the pedal stroke $S_P$ is increased. Accordingly, the link mechanism shown in FIG. 8 has a good stroke controllability in a range where the pedal stroke $S_P$ is small, and also has a good pressing force controllability in a range where the pedal stroke $S_P$ is large.

However, in the conventional link mechanism shown in FIGS. 7 and 8, it is difficult to adjust a change rate of the lever ratio with respect to the pedal stroke $S_P$. Additionally, a change rate of the swing angle of the push rod 50 is increased as the pedal stroke $S_P$ is decreased. Thus, the change rate of the lever ratio $R_P$ is large in the idling range of the brake operation, and is small in the effective range of the braking operation as shown in FIG. 9.

Accordingly, in order to appropriately perform the stroke control and the pressing force control in the effective range, the lever ratio $R_P$ must be sharply changed in the idling range which is a so-called range of play. This may cause an increase in the idle stroke, resulting in loss of a good brake operation feel.

On the other hand, the link mechanism according to the present invention has a characteristic that the lever ratio $R_P$ is decreased as the pedal stroke $S_P$ is increased. Additionally, the change rate of the lever ratio $R_P$ in the idling range is smaller than that in the effective range.

A description will now be given, with reference to the analysis model shown in FIG. 6, of a principle to achieve the above-mentioned characteristic of the present invention. In FIG. 6, a point A corresponds to the pivot shaft 26; a point B corresponds to the pivot shaft 16; an angle $\Theta_{m1}$ (negative value) represents an angle formed between a line (hereinafter referred to as a line AB) connecting the point A and the point B and a member R1 in a state where the braking operation is not performed; an angle $\Theta_{m2}$ (negative value) represents an angle formed between a line AB and a member R1 in a state where the braking operation is performed; an angle $\Theta_0$ represents an angle formed between the axial direction of the booster and a member L2 in a state where the braking operation is not performed; an angle $\Theta_1$ represents an operation angle of the member L1; an angle $\Theta_2$ represents a pivot angle of the member L2; and an angle $\Theta_F$ represents an angle formed between the member Rm and the axial direction of the booster 32.

In the analysis model of the link mechanism shown in FIG. 3, when the member L1 pivots with a small angle $d\Theta_1$, the pivot motion is transmitted via the member R1 to the member Rm to move it toward the line AB. The moment arm length of the member Rm is equal to a distance between the member Rm and the pivot shaft 16, that is, a distance indicated by M1 in FIG. 6. A small displacement $d\alpha$ of the member Rm is represented by $d\alpha = M1*d\Theta_1$.

When the member Rm is moved with the small displacement $d\alpha$, the displacement is transferred to the member L2 with a moment arm length equal to a distance between the member Rm and the pivot shaft 26, that is, a distance indicated by M2 in FIG. 6. Thus, the member L2 and the member R2 pivot with a small angle $d\Theta_2$.

Since a displacement of the connection 22 between the members Rm and R2 is equal to $d\alpha$, the relationship $M1*d\Theta_1 = M2*d\Theta_2$, that is, $d\Theta_2 = (m1/M2)*d\Theta_1$ is established. That is, In the present embodiment, the operation angle $d\Theta_1$ input to the brake pedal 10 is transmitted to the pivot link 24 by being multiplied by M1/M2.

Accordingly, when a pedal stroke $S_P$ is given to the moment arm length L1, a pivot angle $(M1/M2)*S_P/L1$ is generated on the output side. In the analysis model shown in FIG. 7 in which the operation angle is equal on the input side and the output side, the pivot angle $S_P/L1$ is generated on the output side.

This phenomenon is generated by an action of the member Rm. If it is supposed that the moment arm length L1 of the input side is equal to $L1*(M2/M1)$, the link mechanism shown in FIG. 6 can be regarded as a link mechanism having the same input angle and output angle.

On the other hand, the moment arm length of the output side determined by a positional relationship between the member L2 corresponding to the pivot link 24 and the member LB corresponding to the push rod 30 is represented by a distance between the pivot shaft 26 and an intersection of the member LB with a line normal to the axial direction of the booster 32, similar to that of the conventional link mechanism shown in FIG. 7. That is, the moment arm length of the output side is represented by $L2*\sin(\Theta_0+\Theta_1+\Theta_B)/\cos\Theta_B$.

The angle $\Theta_B$ is represented as $\Theta_B = \sin^{-1}\{(Lh-L2*\sin(\Theta_0+\Theta_2))/L_B\}$, similar to the above-mentioned equation (2). Thus, the lever ratio $R_P$ of the present embodiment is finally represented by the following equation.

$$R_P = \frac{L_1 \cos\left\{\sin^{-1}\left[\frac{Lh - L_2\sin(\theta_0 + \theta_2)}{L_B}\right]\right\}}{L_2 \sin\left\{\theta_0 + \theta_2 + \sin^{-1}\left[\frac{Lh - L_2\sin(\theta_0 + \theta_2)}{L_B}\right]\right\}} \times \frac{M_2}{M_1} \quad (6)$$

Accordingly, if $\Theta_2$ and M2/M1 in the equation (6) are represented as a function of the pedal stroke $S_P$, the lever ratio $R_P$ of the present embodiment can be represented as a function of the pedal stroke $S_P$.

In FIG. 6, when distances between the points A and B and intersections with an extension of the member Rm are defined as m1 and m2, a relationship $m2/m1 = M2/M1$ is established. m1 can be represented by using the initial values R1 and $\Theta_{m1}$ and parameters $\Theta_1$ and $\Theta_F$ as follows.

$$m1 = R1*\cos(\Theta_{m1}+\Theta_1) - R1(\Theta_{m1}+\Theta_1)\tan\Theta_F \quad (7)$$

Additionally, $\Theta_F$ in the above equation (7) can be represented by using the initial setting values AB and $\Theta_{m2}$ and the parameter $\Theta_2$ as follows.

$$\theta_F = \sin^{-1} \frac{AB - R_2\cos(\theta_{m2} + \theta_2) - R\cos(\theta_{m1} + \theta)}{R_m} \quad (8)$$

In this case, since $\Theta_1$ can be represented as a function of the pedal stroke $S_P$ ($\Theta_1 = S_P/L1$), m1 can be calculated as a function of the pedal stroke $S_P$ if $\Theta_2$ can be represented as a function of the pedal stroke $S_P$. If M1 can be calculated, m2 is also calculated by using the result based on an equation $m2 = AB - m1$. Thus, m2/m1, that is, M2/M1 in the equation (6) can be represented as a function of the pedal stroke $S_P$.

In the present embodiment, the distance between the connection 18 of the member R1 and the connection 22 of the member R2 is always maintained at Rm. This is a binding condition between the brake pedal 10 and the pivot link 24. That is, $\Theta_1$ and $\Theta_2$, which vary with the variation in the pedal stroke $S_P$, vary so that following relationship is always satisfied.

$$Rm^2 = \{R2*\sin(\Theta_{m2}+\Theta_2) - R1*\sin(\Theta_{m1}+\Theta_1)\}^2 + \{AB - R2*\cos(\Theta_{m2}+\Theta_2) - R1*\cos(\Theta_{m1}+\Theta_1)\}^2 \quad (9)$$

By rearranging the equation (9) with respect to $(\Theta_{m2}+\Theta_2)$, the following quadratic equation is obtained.

$$a*\cos(\Theta_{m2}+\Theta_2)^2 + b*\cos(\Theta_{m2}+\Theta_2) + c = 0 \quad (10)$$

Where factors a, b and c are as follows.

$$a = \left\{\frac{R_1 \sin(\theta_{m1} + \theta_1)}{R_1 \cos(\theta_{m1} + \theta_1) - AB}\right\}^2 + 1$$

$$b = \frac{R_1 \sin(\theta_{m1} + \theta_1)^2}{R_2}$$

$$\frac{\{R_1 \cos(\theta_{m1} + \theta_1) - AB\}^2 - R_m^2 + R_2^2}{\{R_1 \cos(\theta_{m1} + \theta_1) - LM\}}$$

$$c = \frac{b^2}{4} - \left[\frac{R_1 \sin(\theta_{m1} + \theta_1)}{R_1 \cos(\theta_{m1} + \theta_1) - LM}\right]^2$$

By solving the above equation (10), $\Theta_2$ is represented as a function of $\Theta_1$. Accordingly, $\Theta_2$ can be represented as a function of the pedal stroke $S_P$ as follows, and the lever ratio $R_P$ can be represented as a function of the pedal stroke $S_P$.

$$\cos(\Theta_{m2}+\Theta_2) = \{-b \pm \sqrt{(b^2 - 4ac)}\}/2a \quad (11)$$

Accordingly, if $(\Theta_{m1}+\Theta_1) \leq 0$, a relationship $(\Theta_{m2}+\Theta_2) = \cos^{-1}\{[-b+\sqrt{(b^2-4ac)}]/2a\}$ is obtained; and if $(\Theta_{m1}+\Theta_1) > 0$, a relationship $(\Theta_{m2}+\Theta_2) = \cos^{-1}\{[-b-\sqrt{(b^2-4ac)}]/2a\}$ is obtained.

A solid line in the graph of FIG. 9 indicates the result of calculation based on the above-mentioned equations with respect to the relationship between the lever ratio $R_P$ and the pedal stroke $S_P$ of the link mechanism according to the present embodiment. Apparent from the graph of FIG. 9, the lever ratio $R_P$ of the link mechanism of the present embodiment is decreased gently in the idling range and sharply in the effective range as compared to that of the conventional link mechanism shown in FIGS. 7 and 8. Accordingly the link mechanism according to the present embodiment has a characteristic suitable for a brake apparatus.

The following Table 1 shows dimensions of parts of a link mechanism according to the present embodiment in which a change rate of 0.366%/mm is achieved in a range 0–100 mm of the pedal stroke $S_P$. The following Table 2 shows performance of the link mechanism according to the present embodiment and the conventional link mechanism when the idling range is set as 0–20 mm and the effective range is set as 20–80 mm.

TABLE 1

|  | L1 | R1 | Rm | R2 | L2 | LB | AB |
|---|---|---|---|---|---|---|---|
| Dim. (mm) | 240 | 61 | 24 | 63 | 120 | 180 | 113.1 |

|  | Lh | $\Theta_{m1}$ | $\Theta_0$ |
|---|---|---|---|
| Dim. (mm) | 115 | −22° | 71° |

TABLE 2

| change rate | change rate | change rate |
|---|---|---|
| 0.366%/min | idling range | effective range |
| present invention | 0.377 | 0.462 |
| conven. apparatus | 0.547 | 0.382 |

| change rate | swing angle | distance |
|---|---|---|
| 0.366%/min | of push rod | Lx |
| present invention | 2.3° | 65 mm |
| conven. apparatus | 3.9° | 730 mm |

The reason for the superior characteristics exhibited in the link mechanism according to the present invention is that M2/M1, that is m2/m1 is set to be a maximum in the vicinity of the end of the idling range.

In the brake apparatus according to the present embodiment, the lever ratio $R_P$ is increased as long as the action of the connection link 20 is concerned while the brake pedal 10 is moved from the initial position to the end of the idling range. After the brake pedal 10 has passed the end of the idling range, the connection link 20 acts to promote a decrease of the lever ratio $R_P$.

The lever ratio $R_P$ is decreased as the pedal stroke $S_P$ is increased as long as the action of the connection link 24 and the push rod 30 is concerned. Accordingly, as a whole link mechanism, the lever ratio $R_P$ is decreased as the pedal stroke $S_P$ is increased, and the rate of change of the lever ratio $R_P$ is minimized at the end of the idling range. This is a specific characteristic of the link mechanism according to the present embodiment.

In the present embodiment, as shown in FIG. 5, the angle between the push rod 30 and the member L2 is set to about 90° in the effective range and about 70° in the initial state in order to restrict the swing of the push rod 30.

Accordingly, as shown in the above Table 2, the swing angle of the push rod 30 is greatly reduced as compared to that of the conventional link mechanism. Additionally, for the reason that the swing angle of the push rod 30 can be restricted, the distance Lx between the end of the push rod 30 and the pivot shaft 16 of the brake pedal 10 is greatly reduced as compared to that of the conventional link mechanism. Thus, the link mechanism according to the present embodiment is superior to the conventional link mechanism with respect to compactness which results in superior mountability of the brake apparatus to the vehicle body.

Figure 10:
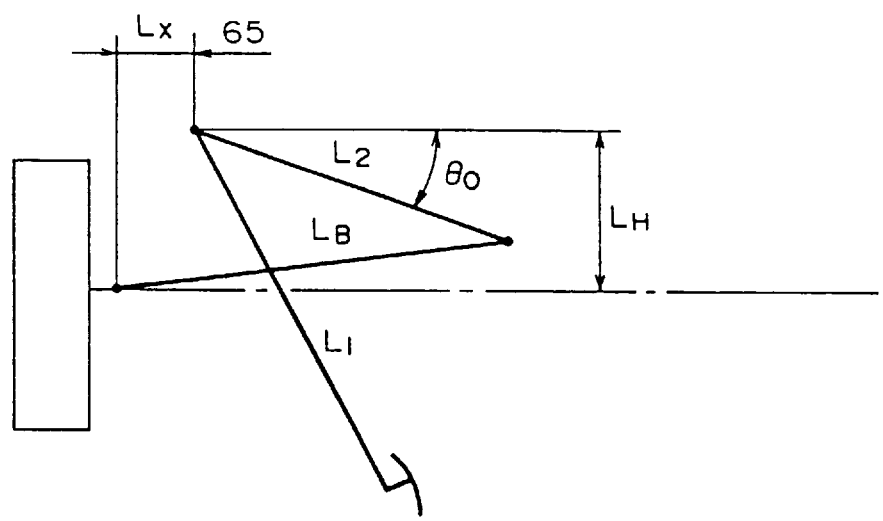
FIG. 10 is an analysis model of the link mechanism shown in FIG. 7.

FIG. 10 is an analysis model of the link mechanism shown in FIG. 7. In the analysis model of FIG. 10, the distance Lx between the end of the push rod and the brake pedal is set to 65 mm. The following Table 3 shows results of calculation for five different setting of dimensions except for the distance Lx being fixed to 65 mm.

TABLE 3

| No. | L1 | L2 | Lh | LB | $\Theta_0$ | $R_p(S_p = 0)$ |
|---|---|---|---|---|---|---|
| 1 | 240 | 150 | 100 | 196 | 30° | 2.61 |
| 2 | 240 | 290 | 100 | 345 | 15° | 2.51 |
| 3 | 240 | 500 | 100 | 573 | 0° | 2.70 |
| 4 | 240 | 1000 | 95 | 1066 | 0° | 2.68 |
| 5 | 240 | 10000 | 90 | 10065 | 0° | 2.68 |

| No. | $R_p(S_p = 100)$ | swing angle of booster | change rate ($S_p = 0$–100) |
|---|---|---|---|
| 1 | 2.15 | 13.5° | 0.176(%/mm) |
| 2 | 1.89 | 17.9° | 0.247 |
| 3 | 2.01 | 20.3° | 0.255 |
| 4 | 1.88 | 22° | 0.298 |
| 5 | 1.74 | 23.6° | 0.350 |

Among the sets 1–5 in the Table 2, the sets other than set No.1 are not practical because a leg space must be provided in the vicinity of the brake pedal. The set No.1 has a rate of change only about 0.18%/mm. However, in practical use, the rate of change of the lever ratio $R_P$ is needed. Apparently, the distance Lx of 65 mm cannot be set in the link mechanism shown in FIG. 7. In this respect, the link mechanism according to the present embodiment has an advantage in that the pivot shaft 26 can be moved further to the front side of a vehicle as compared to the conventional link mechanism.

Additionally, as shown in FIG. 5, the link mechanism according to the present embodiment has the pivot shaft 16 of the brake pedal 16 being positioned in front of the pivot shaft 26 of the pivot link 24. Thus, there is no need to maintain a distance between the pedal 14 and the pivot shaft 26 in the front-to-rear direction of the vehicle. Accordingly, in the link mechanism according to the present embodiment, the distance required between the pedal 14 and the brake booster 32 in the front-to-rear direction is greatly reduced.

The brake apparatus according to the present embodiment is fixed, as shown in FIG. 4, to a dash panel 54 of the vehicle via a pedal support which supports the pivot shafts 16 and 26 of the link mechanism. The dash panel 54 extends between a cowl 58 and a side member 56 which is a frame of the vehicle so as to separate the engine compartment and the passenger compartment. In the present embodiment, an end of the pedal support 52 is fixed to the dash panel 54 adjacent to the side member 56.

The pedal support 52 has a pivot portion 52*a* at a lower end thereof. The pivot portion 52*a* is fixed to the dash panel 54. On the other hand, an upper portion of the pedal support 52 is fixed to the dash panel 54 together with the booster 32.

Thus, when the booster 32 is displaced from the front side to the rear of the vehicle, the pedal support 52 rotates about the pivot portion 52a.

The booster 32 is provided for increasing the operational force transmitted via the push rod 30 as mentioned above. A master cylinder 31 is positioned in front of the booster 32 in the engine compartment. The master cylinder 31 supplies a hydraulic pressure generated in response to a force increased by the booster 32 to each wheel cylinder (not shown). A reservoir tank 60 is provided above the master cylinder 31 to supply brake fluid to the master cylinder 31.

Figure 11:
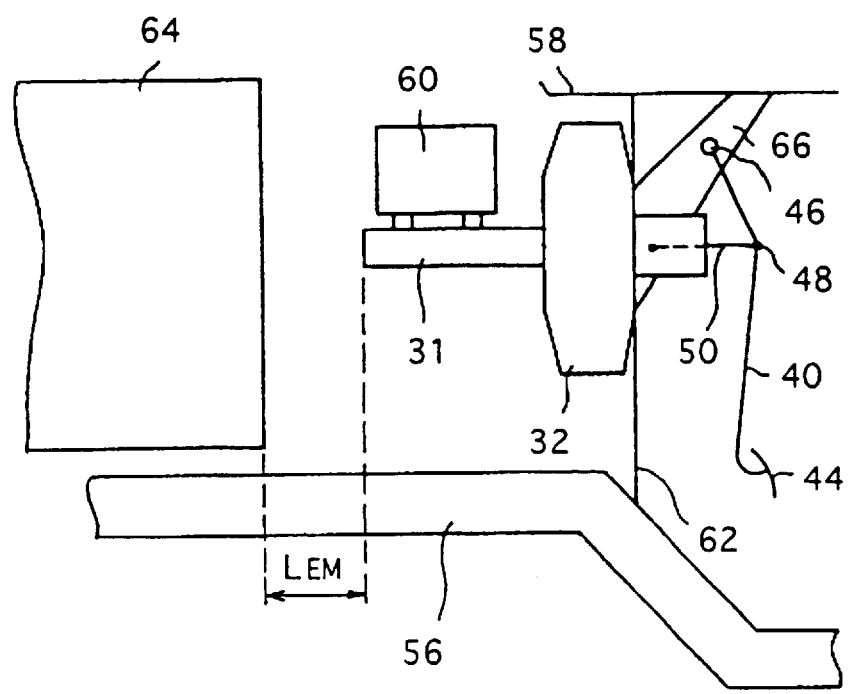
FIG. 11 is an illustration of a side view of the conventional link mechanism shown in FIG. 7 in a state where the link mechanism is mounted on a vehicle.

FIG. 11 is an illustration of a side view of the conventional link mechanism shown in FIG. 7 in a state where the link mechanism is mounted on a vehicle. In FIG. 11, parts that are the same as the parts shown in FIG. 4 are given the same reference numerals, and descriptions thereof will be omitted.

As shown in FIG. 11, the master cylinder 31 and the booster 32 are mounted to a dash panel 62 extending above the side member 56. Accordingly, in a vehicle having an engine in the front of the vehicle, an engine 64 is positioned in front of the master cylinder 31.

Since the pivot shaft 46 of the brake pedal 40 is preferable to be provide in a rigid portion of the vehicle, the pivot shaft 46 is typically supported by a pedal support 66 which is fixed to a dash panel 62 and a cowl 58 extending above the dash panel 62. In this case, the cowl 58 has a higher rigidity than the dash panel 62 and the brake pedal 40 is rigidly supported.

In the structure shown in FIG. 11, when the master cylinder 31 is pressed toward the passenger compartment by the engine being moved due to a collision, the master cylinder 31 and the booster 32 are moved about a connecting portion between the pedal support 66 and the cowl 58. As a result, the pedal 44 is moved toward the interior of the passenger compartment.

In this case, in order to provide a large space in the passenger compartment even when a front crush occurs, a displacement of the pedal 44 is preferably restricted to as small a distance as possible. In this respect, it is desirable that the engine hardly hits the master cylinder 31 when a front crush occurs. That is, it is desirable that a distance $L_{EM}$ between the engine 64 and the master cylinder 31 is set as large as possible.

The position of the master cylinder 31 is determined based on the position of the brake pedal 40, a pedal ratio given to the brake pedal 40 and a configuration of the booster 32. Thus, there is little freedom in the design. Accordingly, in the conventional brake apparatus in which the distance between the booster and the brake pedal in the front-to-rear direction of the vehicle is small, it is difficult to reserve a large distance $L_{EM}$.

On the other hand, in the brake apparatus shown in FIG. 4, the distance between the booster and the brake pedal is can be easily reduced as compared to the conventional brake apparatus. Thus, in the brake apparatus according to the present embodiment, a large distance $L_{LE}$ can be provided between the engine 64 and the master cylinder 31.

Figure 12:
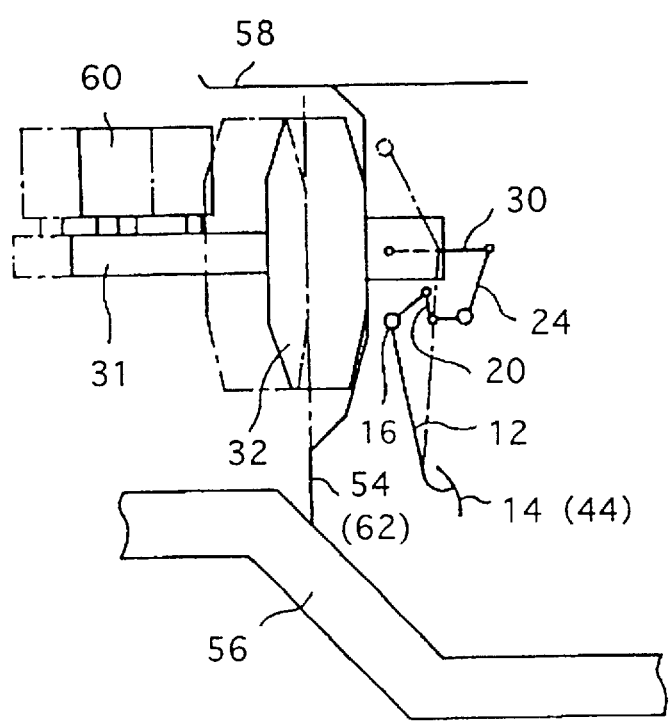
FIG. 12 is an illustration for explaining positions of a master cylinder in the brake apparatus according to the present embodiment and that in the conventional brake apparatus.

FIG. 12 is an illustration for explaining positions of the master cylinder in the brake apparatus according to the present embodiment and that in the conventional brake apparatus. In FIG. 12, the parts in the brake apparatus according to the present embodiment are drawn by solid line and the parts in the conventional brake apparatus are drawn by chain line. The brake pedal 40 for the present embodiment and the conventional brake apparatus are positioned at the same position.

As shown in FIG. 12, in the present embodiment, the brake pedal and the pedal 14 can be positioned close to each other. Thus, the master cylinder 31 can be moved toward the passenger compartment from a position in the conventional brake apparatus.

Accordingly, in the brake apparatus according to the present embodiment, the master cylinder 31 and the engine can be placed within a given space with a large distance $L_{EM}$ therebetween. As discussed above, the brake apparatus according to the present embodiment has a great advantage in that a large space can be maintained in the passenger compartment when a front crush occurs.

In FIG. 11, the brake pedal 44 is moved toward the interior of the passenger compartment when the engine 64 presses the master cylinder 31 because the pedal support 66 is fixed to the cowl 58 which extends above the pivot shaft 46 of the brake pedal 40.

That is, in the brake apparatus shown in FIG. 11, if the pedal support 66 is supported in the vicinity of the side member 56 under the pivot shaft 46, the displacement of the pedal 44 due to the master cylinder being pressed toward the passenger room can be prevented.

Figure 13:
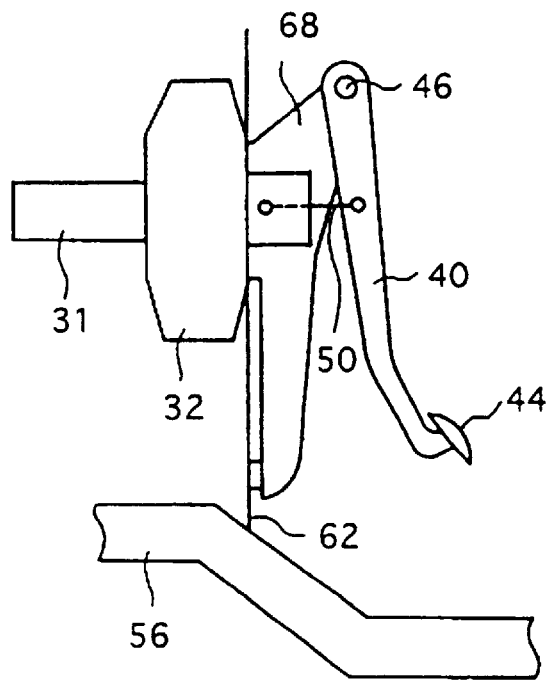
FIG. 13 is an illustration of a brake apparatus for explaining a variation of a pedal support shown in FIG. 11.

That is, for example, as shown in FIG. 13, if the pedal support 68 is formed so that a lower end of the pedal support 68 extends downwardly from the booster 32 and its upper end supports the pivot shaft 46, the brake pedal 40 pivots about the lower end of the pedal support 68 when a pressing force is applied to the master cylinder from the front of the vehicle. As a result, the pedal 44 is moved toward the dash panel 62.

Accordingly, if the pedal support shown in FIG. 13 is used, a displacement of the brake pedal toward the interior of the passenger compartment can be prevented in the brake apparatus having the conventional link mechanism despite that a large distance $L_{EM}$ is not provided between the engine 64 and the master cylinder 31.

However, the pedal support 68 shown in FIG. 10 has the upper end extending above the booster 32 and the lower end extending adjacent to the side member 56. Thus, the pedal support 68 is essentially increased. Additionally, in such a configuration, since the pivot shaft 46 must be supported at the upper end thereof, the pedal support 68 must have a strength sufficient for supporting the brake pedal 40 in a one-side support state.

Accordingly, when the pedal support shown in FIG. 13 is used, the pedal support 68 must be formed of a light material having sufficient strength such as diecast aluminum. However, this increases manufacturing cost of the brake apparatus. Additionally, even if the pedal support is formed of such a light weight material, weigh of the pedal support is not sufficiently reduced, resulting in an increase in a total weigh of the vehicle.

In this respect, the brake apparatus shown in FIG. 13 is not always suitable for use in a vehicle although it satisfies the requirement to reserve a space in the passenger compartment when a front crash occurs.

On the other hand, the brake apparatus according to the present embodiment shown in FIG. 4 has the pivot shaft 16 of the brake pedal 10 provided under the center axis of the master cylinder 31 on the side member 56 side. Thus, the pedal support 52 is of a small size even though it has a portion fixed to the dash panel 54 under the pivot shaft 16.

Additionally, since the pedal support 52 used in the present embodiment is supported on opposite sides, rigidity sufficient to support the brake pedal 10 via the pivot shaft 16 can be obtained without using a high strength material. Thus, the brake apparatus according to the present embodiment can provide the structure in which the pedal 14 is moved toward the dash panel 54 when a front crash occurs without increasing weight and manufacturing cost.

As discussed above, in the brake apparatus according to the present embodiment, a crash energy is hardly transmitted to the master cylinder 31, and if the crash energy should reach the master cylinder 31, a displacement of the pedal 14 toward the interior of the passenger compartment is prevented.

In the present embodiment, the pedal support 52 is connected to the dash panel 54 via the pivot portion 52a. Thus, when a force is supplied that moves the master cylinder 31 toward the interior of the passenger room, the pedal support 54 can be easily pivoted about the pivot portion 52a. In this respect, the structure according to the present embodiment has an advantage that the pedal 14 can positively be moved toward the dash panel when the master cylinder 31 is moved toward the passenger compartment due to a front crash.

Additionally, the structure of the present embodiment having the pedal support 52 with an end mounted to the dash panel 54 adjacent to the side member 56 has an advantage over the conventional structure having the pedal support 66 with an end mounted to the cowl 58, with respect to obtaining a sufficient rigidity of the brake pedal.

That is, since the side member 56 is a strength member constituting a part of a vehicle frame, the dash panel 54 has a high rigidity in the vicinity of the side member 56 as compared to the cowl 58. Thus, the pedal support 52 of the present embodiment has a high rigidity in a portion mounted to the dash panel 54, and thereby the brake pedal 10 can be supported with a high rigidity. In this respect, the brake apparatus according to the present embodiment has an advantage over the conventional structure, besides the above-mentioned advantages, that a high rigidity can be provided to the support of the brake pedal 10.

Figure 14:
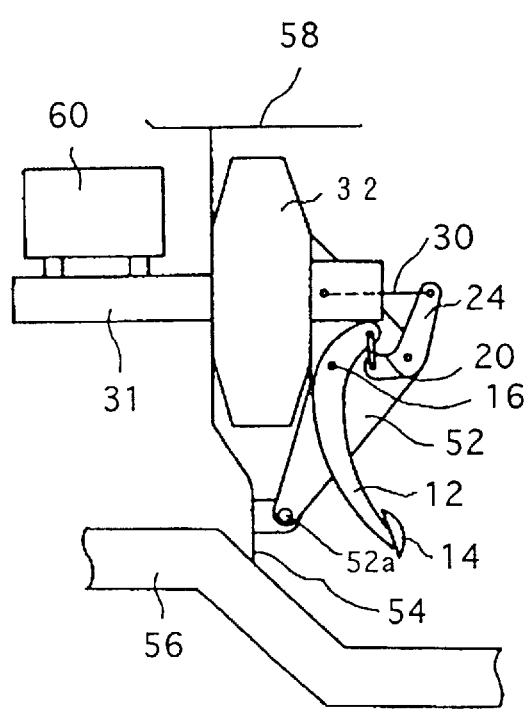
FIG. 14 is an illustration of a side view of a brake apparatus according to a second embodiment of the present invention.

FIG. 14 is an illustration of a side view of a brake apparatus according to a second embodiment of the present invention. In FIG. 14, parts that are the same as the parts shown in FIG. 4 are given the same reference numerals, and descriptions thereof will be omitted.

In the brake apparatus shown in FIG. 14, the booster 32 is provided in the interior of the passenger compartment. In this case, the brake pedal 10, the connection link 20, the pivot link 24 and push rod 30 can be assembled with the booster 32 prior to being mounted to the dash panel 54.

Accordingly, the final assembling process can be simplified so that only the booster 32 and the master cylinder 31 are mounted on the opposite sides of the dash panel 54. In this case, prior position adjustment of the pedal 14 eliminates position adjustment after the assembly of the brake apparatus to the vehicle body. That is, as shown in FIG. 14, since the booster 32 is positioned in the interior of the passenger compartment, the final assembling process of the brake apparatus according to the present embodiment can be greatly simplified.

Additionally, in the structure shown in FIG. 11 in which the pedal support 66 is mounted to the cowl 58 and the dash panel 62, assembling tolerances are collected in the mounting position of the pedal support 66. On the other hand, in the structure shown in FIG. 14 in which the pedal support 52 is mounted only to the dash panel 54, a collection of assembling tolerances is not generated. Thus, according to the present embodiment, the position adjustment of the pedal 14 can be performed prior to the assembly of the brake apparatus to the vehicle body with high accuracy.

In the above-mentioned embodiment, the master cylinder 31 and the booster 32 previously assembled with the brake pedal 10 are respectively mounted on the opposite sides of the dash panel 54. However, when an appropriate opening can be formed in the dash panel 54, a unit comprising the brake pedal 10 and the master cylinder assembled to the booster 32 may be mounted to the dash panel 54 so that the unit can be assembled from the interior of the passenger compartment.

In the embodiments shown in FIGS. 4 and 14, the pedal support 52 is mounted to the dash panel 54 via the pivot portion 52a. However, the pedal support 52 may be directly mounted to the dash panel 54.

Figure 15:
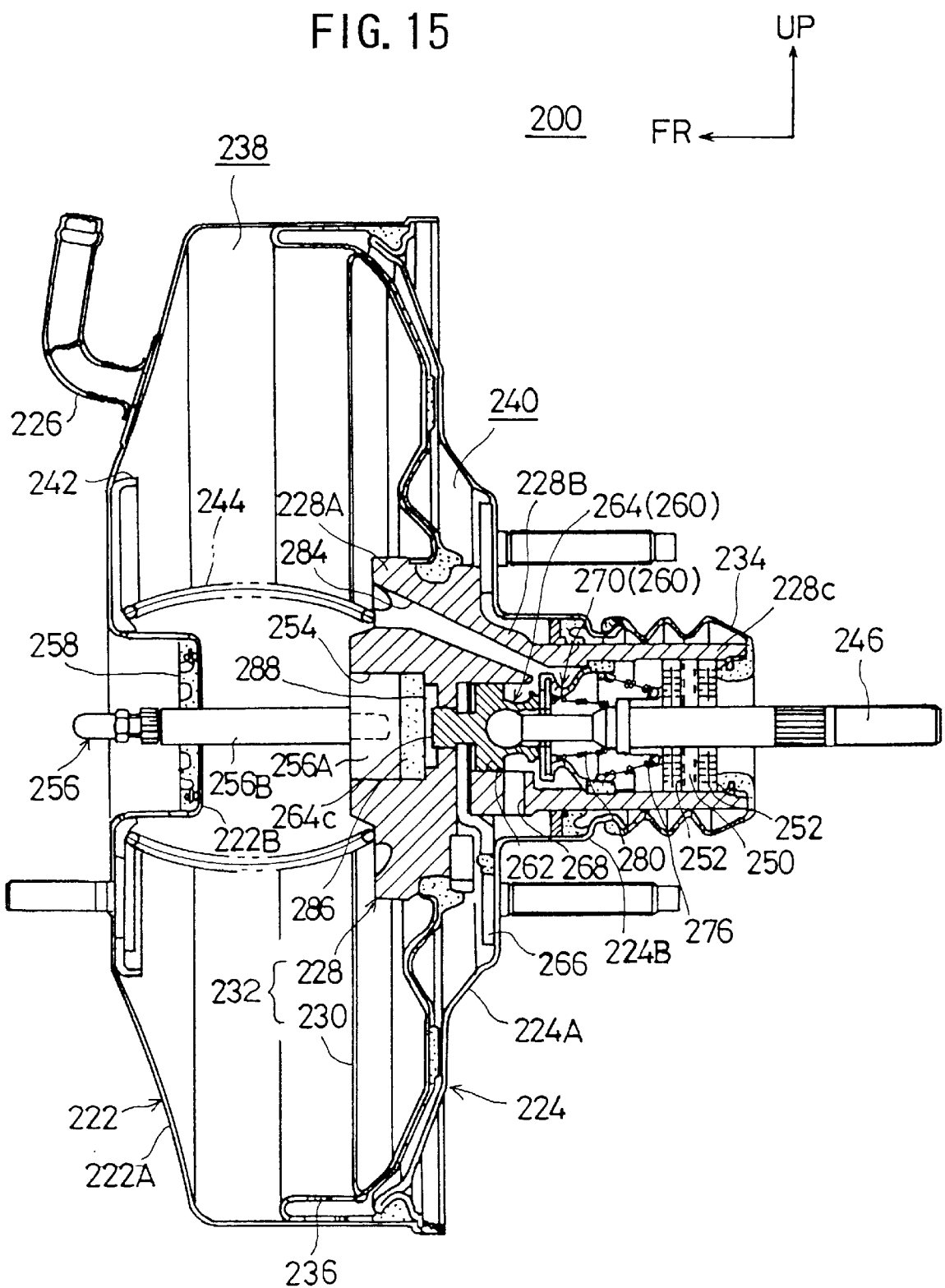
FIG. 15 is a cross-sectional view of a brake booster used in a third embodiment of the present invention.

A description will now be given of a third embodiment of the present invention. FIG. 15 is a cross-sectional view of a brake booster 200 used in the third embodiment of the present invention.

As shown in FIG. 15, the booster 200 comprises a front shell 222 and a rear shell 224. The entire booster 200 is formed like a flattened cylinder. The front shell 222 has a body 222A having a cylindrical shape with a bottom. A protruding portion 222B is formed in the center of the bottom of the body 222A. The protruding portion 222B protrudes toward an interior of the body 222A, that is, the protruding portion 222B protrudes rearwardly of the vehicle. Additionally, the body 222A is provided with a negative pressure introducing port 226 which is connected to an intake manifold (not shown in the figure).

The rear shell 224 has a dish-like base portion 224A. A protruding portion 224B is formed in the center of the base portion 224A. The protruding portion 224B protrudes rearwardly of the vehicle.

A power piston 232 is movably provided in the axial direction in the rear shell 224. The power piston 232 comprises a valve body 228 and a diaphragm plate 230. The valve body 228 comprises a cylindrical main body 228A, an intermediate part 228B and a cylindrical part 228C. The main body 228A has a diameter greater than the diameter of the protruding portion 224B of the rear shell 224. The intermediate part 228B is formed to protrude rearwardly of the vehicle and has a diameter less than the diameter of the protruding portion 224B. The cylindrical part 228C is formed on the intermediate part 228B rearwardly of the vehicle. A rear end of the cylindrical part 228C protrudes further from an end of the protruding portion 224B of the rear shell 224, and is covered by a boot 234.

The diaphragm plate 230 is dish-shaped and has a center hole which engages with an outer surface of the main body 228A of the valve body 228. A diaphragm 236 is applied on an outer surface of the diaphragm plate 230.

An inner rim of the diaphragm 236 is secured on the outer surface of the main body 228A of the valve body 228. An outer rim of the diaphragm 236 is secured between an outer rim of the front shell 222 and an outer rim of the rear shell 224. Thus, a space between the front shell 222 and the rear shell 224 is divided into a negative pressure chamber (vacuum chamber) 238 and an atmospheric pressure chamber 240 by the diaphragm 236.

A spring sheet 242 is fit on an outer surface of the protruding portion 222B of the front shell 222. A return spring is interposed between the spring sheet 242 and the valve body 228 of the power piston 232. Thus, the return spring 244 always presses the power piston 232 against the base 224A of the rear shell 224.

An operating rod 246 is provided in the interior of the cylindrical part 228C of the valve body 228. A rear end of the operating rod 246 is connected to the push rod 30 (refer to FIG. 5). Hereinafter, a description will be given on the assumption that the brake booster 200 is used with the link mechanism of the first embodiment shown in FIG. 4.

When the brake pedal 10 is operated, the operating rod 246 is pressed by the push rod 30. Thus, the operating rod 246 moves frontwardly of the vehicle. A pair of filters 252 are provided in the cylindrical part 228C. A silencer 250 is interposed between the pair of filters 252. The operating rod 246 extends through the filters 252 and silencer 250 further inside the cylindrical part 288C. An end of the operating rod 246 protruding into the cylindrical part 228C engages with a valve mechanism 260 as described later.

A recess 254 is formed in the center of the main body 228A of the valve body 228. The recess 254 is provided with a reaction disk 286 and a push rod 256. The push rod 256 comprises a base portion 256A and a rod portion 256B. The base portion 256A is fit into the recess 254. The rod portion 256B extends from the base portion 256A and passes through the protruding portion 222B of the front shell 222. An end of the rod portion 256B is situated in the master cylinder 32 to press a piston (not shown) in the master cylinder 32. A bottom of the protruding portion 222B of the front shell 222 is provided with a seal material 258.

A description will now be given of the valve mechanism 260.

Figure 16:
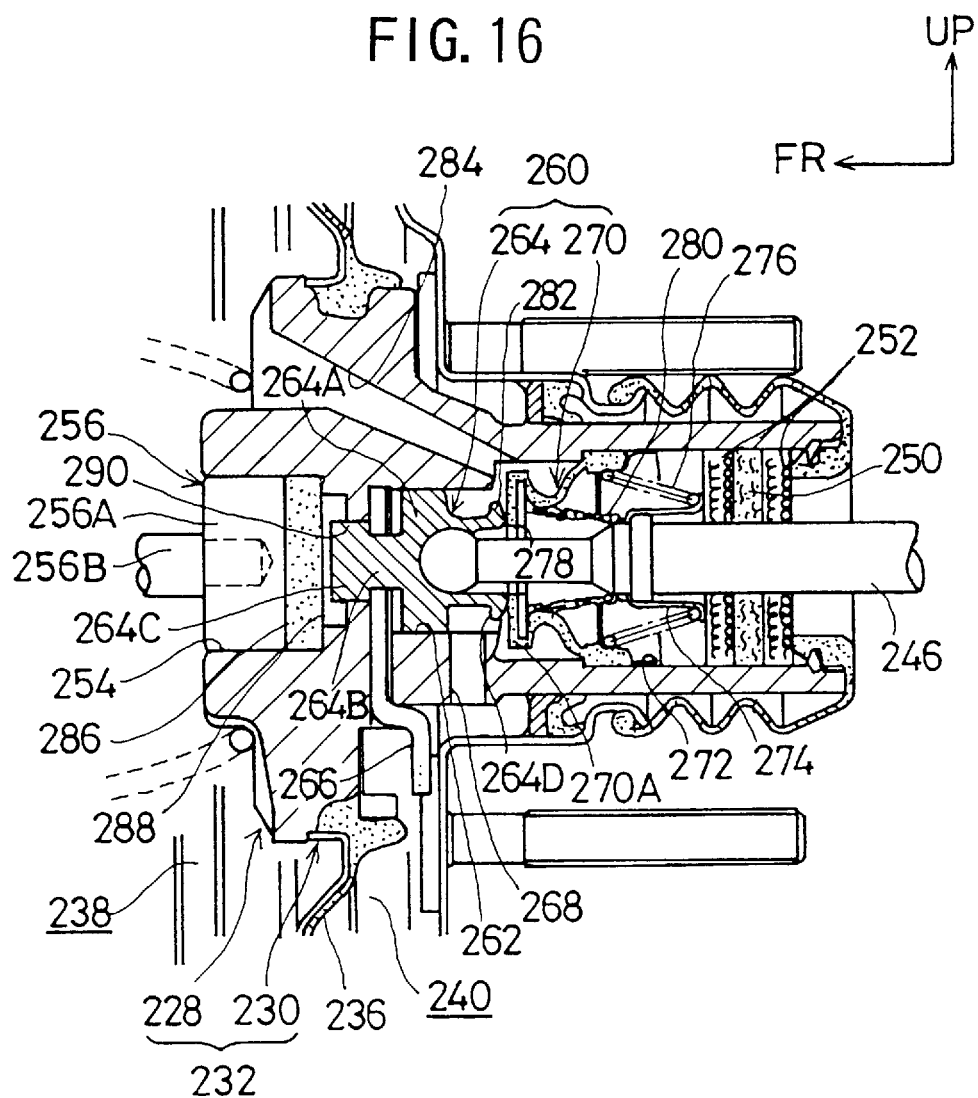
FIG. 16 is a cross sectional view of a part of the brake booster shown in FIG. 15.

As shown in FIG. 16, a recess 262 is formed at a position facing the recess 254 in the intermediate part 228B of the valve body 228. A plunger 264 is provided in the recess 262. The plunger 264 comprises a plunger body 264A, a neck portion 264B, a pressing portion 264C and an atmospheric pressure valve 264D.

The plunger body 264A is slidable within the recess 262. The pressing portion 264C is formed to protrude toward the recess 254 of the main body 228A via the neck portion 264B. The atmospheric pressure valve 264D is formed to protrude toward the operating rod 246 from the plunger body 264A so as to enclose a spherical head of the operating rod 246. Since a key 266 is fit in the neck portion 264B, the plunger 264 cannot be moved off from the valve body 228.

An atmosphere passage 268 is formed in a predetermined position in the intermediate part 228B of the valve body 228 corresponding to the above-mentioned plunger 264. An end of the atmosphere passage 268 is open to the atmospheric pressure chamber 240. The other end of the atmosphere passage 268 is open to the recess 262 of the intermediate part 228B of the valve body 228. Thus, an inner space of the cylindrical portion 288 of the valve body 228 is connected to the atmospheric pressure chamber 240. Additionally, a rubber poppet 270 is provided on the rear side of the atmospheric pressure valve 264D of the plunger 264. The poppet 270 comprises a ring-like front portion, a cylindrical rear portion and an intermediate portion connecting the front portion and the rear portion.

A retainer 272 having a hat-like cross-section is provided on a rear end of the poppet 270. A spring sheet having a hat-like cross-section is fixed on the operating rod 246. A return spring 276 is interposed between the retainer 272 and the spring seat 274. Thus, the return spring 276 always presses the retainer 272 against the plunger 264. Thereby, the rear end of the poppet 270 is interposed between the retainer 272 and a step formed on an inner surface of the cylindrical portion 228C.

A retainer 278 is fit in an inner side of the front end of the poppet 270 so that the front end is rigid. Hereinafter, the front end is referred to as a vacuum valve 270A. A return spring 280 is interposed between the retainer 278 and the spring seat 274. Thus, the return spring 280 always presses the vacuum valve 270A of the poppet 270 against the intermediate part 228B of the valve body 228. Additionally, a valve seat 282 is formed on the pressing side of the vacuum valve 270A. Thus, the vacuum valve 270A is pressed against the valve seat 282 due to the pressing force of the return spring 280 when it is needed.

A negative pressure passage 284 is formed in the main body 228A and the intermediate part 228B of the valve body 228 correspondingly to the poppet 270. An end of the negative pressure passage 284 is open to the negative pressure chamber 238. The other end of the negative pressure passage 284 is open to a space adjacent to the valve seat 282 contacted by the vacuum valve 270A of the poppet 270. Thereby, the negative pressure passage 238 is always connected to the atmospheric pressure chamber 240.

A description will now be given of a reaction disk 286 positioned between the base part 256A of the push rod 256 and the pressing portion 264C of the plunger 264 and a structure related to the reaction disk 286 in the above-mentioned brake booster 200.

As shown in an enlarged scale in FIG. 16, the reaction disk 286 is accommodated in the recess 254 formed in the main body 228A of the valve body 228. More specifically, since the recess 254 has a cylindrical shape having a predetermined inner diameter and the reaction disk 286 has an outer diameter substantially equal to the inner diameter of the recess 254, the reaction disk 286 is fit in the bottom of the recess 254.

The reaction disk 286 is made of rubber having a predetermined hardness. The reaction disk 286 functions to provide a predetermined servo ratio by distributing a reaction force from the master cylinder 32 during a braking operation to the power piston 232 and the plunger 264. The reaction disk 286 also has a function to provide a predetermined jumping function by being separated from the plunger 264 during the initial stage of the braking operation.

A bottom surface of the recess 254 is recessed so that a cylindrical space 288 having a predetermined depth is formed. The space 288 constitutes means for increasing a servo ratio so that the servo ratio increases stepwisely.

A through passage 290 is formed in the center of the space 228 in which the pressing portion 264C of the plunger 264 is slidably provided. An inner diameter of the space 288 is between the inner diameter of the recess 254 and the inner diameter of the through passage 290. An end of the pressing portion 264C protrudes inside the space 288 a predetermined distance when the pressing portion 264C of the plunger 264 is positioned in the through passage 290.

A description will now be given of an operation of the booster 200.

During a non-braking operation when the brake pedal is not operated by a driver, the power piston 232 is pressed to the bottom of the base 224A of the rear shell 244 due to the pressing force of the return spring 244 as shown in FIG. 16. In this state, the operating rod 246 and the plunger 264 are pressed to initial positions by a pressing force of the return spring 276. Additionally, in this state, the vacuum valve 270A of the poppet 270 is pressed to a position where the vacuum valve contacts the atmospheric valve 264D of the plunger 264 by a pressing force of the return spring 280.

As a result, the vacuum valve 270A is not in contact with the poppet 270, resulting in a predetermined gap formed therebetween. Accordingly, a negative pressure valve (corresponding to a check valve provided in the negative pressure introducing port 226 or a passage connected thereto) and the vacuum valve 270A are in an open state, and the atmospheric valve 264D is in a closed state.

Figure 17:
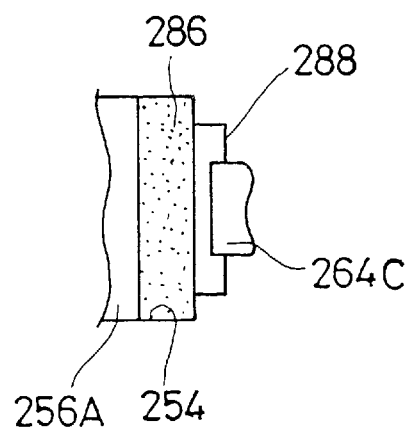
FIG. 17 is an enlarged view for explaining a positional relationship between a reaction disk and a pressing portion shown in FIG. 16.

Thus, a negative pressure of the intake manifold (not shown) is introduced into the negative pressure chamber 238 and the atmospheric pressure chamber 240, and there is no difference in the pressure of the chambers 238 and 240. That is, the booster 200 is in a non-operated state. In this state, as shown in FIG. 17, the pressing portion 264C of the plunger 264 is positioned within the space 288, but it is not in contact with the rear surface of the reaction disk 286.

When the brake pedal 10 is operated in this state, and a force is applied to the operating rod 246, as shown in FIG. 18, the power piston 232 is positioned still in the initial position. However, the operating rod 246 is pressed toward the left side in the figure against the pressing force of the return spring 276. Thus, the pressing portion 264C of the plunger 264 contacts the rear surface of the reaction disk 286 as shown in FIG. 19 in an enlarged scale.

Thus, the vacuum valve 270A of the poppet 270 is moved to follow a movement of the atmospheric pressure valve 264D of the plunger 264 due to the pressing force of the return spring 280, and thereby the vacuum valve 270A contacts the valve seat 282. Thus, the negative pressure passage 284 is closed by the vacuum valve 270A. After that, the negative pressure is not introduced into the atmospheric pressure chamber 240. In this case, the pressing force applied to the brake pedal 10 is transmitted to the push rod 256 after it is converted according to the lever ratio and via the operating rod 246, the plunger 264 and the reaction disk 286. That is, the brake booster 200 is in an operated state.

Figure 20:
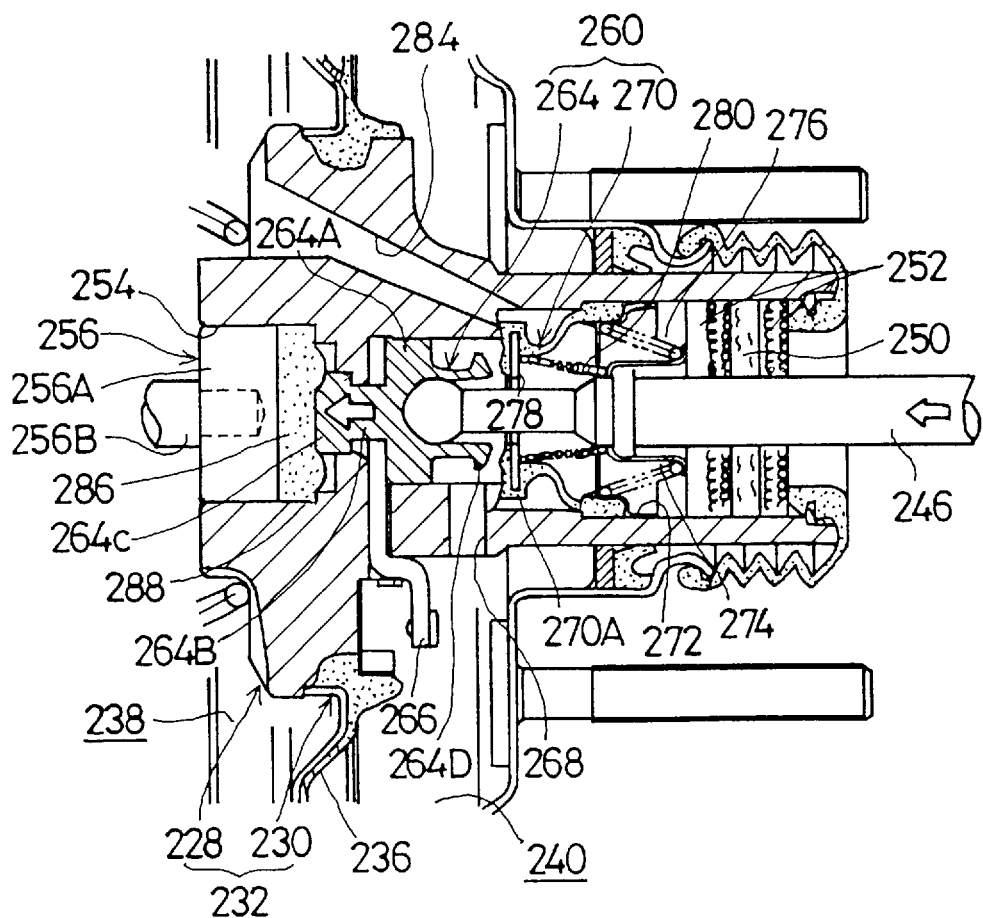
FIG. 20 is a cross sectional view of a part of the brake booster shown in FIG. 15 in a state where the pressing portion is partly embedded in the reaction disk.

When the brake pedal 10 is further pressed and the operating rod 246 is supplied with the pressing force, the push rod 256 is further pressed to the left side in the figure as shown in FIG. 20. The atmospheric pressure valve 264D of the plunger 264 is separated from the vacuum valve 270A of the poppet 270. Thus, the atmospheric pressure is introduced into the cylindrical part 228 via the air filters 252 and the silencer 250, and further into the atmospheric pressure chamber 240 via the atmosphere passage 268.

Accordingly, a pressure difference is generated between the negative pressure chamber 238 and the atmospheric pressure chamber 240. The power piston 232 starts to move to the left in the figure when the pressure difference exceeds the pressing force of the return spring 244. In this case, the pressing force transmitted to the operating rod 246 is transmitted to the push rod 256 via both of the plunger 264 and the power piston 232.

As a result, the brake force input by the driver through the link mechanism is increased by the brake booster 200. That is, this state is an operated state of the brake booster 200.

A discussion will be made of an operation of the reaction disk 286 in the space 288 during the operated state.

Figure 21:
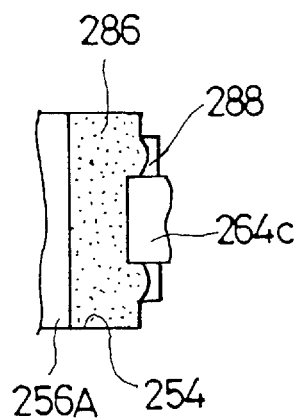
FIG. 21 is an enlarged view for explaining a positional relationship between the reaction disk and the pressing portion shown in FIG. 20.
Figure 22:
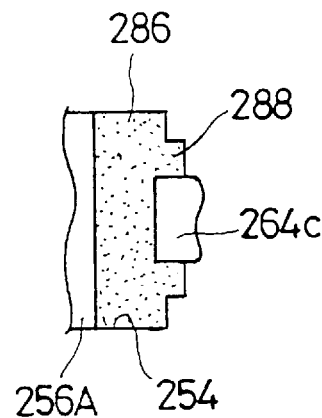
FIG. 22 is an enlarged view for explaining a positional relationship between the reaction disk and the pressing portion shown in FIG. 20 when the pressing portion is further moved toward the reaction disk.

As shown in FIG. 21, when a pressing force applied to the pedal 14 of the brake pedal 10 is small (low pressing force region), the reaction disk 286 protrudes to the middle of the space 288. Thus, a portion of the reaction disk around the pressing portion 264C protrudes toward the interior of the space 288. When the pedal 14 is further pressed from this state, the reaction disk 286 protrudes within the entire space 288 as shown in FIG. 22 since reaction force from the master cylinder 32 is increased. This state is referred to as a high pressing force region. Thus, the entire periphery of the pressing portion 264C is covered by the reaction disk 286 in the space 288.

Accordingly, a contacting area $S_1$ between the rear surface of the reaction disk 286 and the recess 254 of the valve body 228 and the inner surface of the space 288 differs from that in the low pressing force region to that in the high pressing force region. Specifically, the contacting area $S_1$ is small in the low pressing force region, and the contacting area $S_1$ becomes large in the high pressing force region.

As a result, the following equation is given in which a ratio of the input from the operating rod 246 to an output of the push rod 256 is decreased in the low pressing force region and is increased in the high force pressing region.

(servo ratio)=(contacting area $S_1$/contacting area $S_2$)+1

Where the contacting area $S_1$ is an area between the rear surface of the reaction disk and the power piston; the contacting area $S_2$ is an area between the rear surface of the reaction disk and the plunger.

As discussed above, the characteristic of the booster 200 is represented by solid lines which exhibit substantially a concave curve as shown in a graph of FIG. 23. It should be noted that a single dashed chain line in the graph of FIG. 23 represents a booster characteristic when the servo ratio is constant which is performed in a regular brake booster. A double dashed chain line in FIG. 23 is the conventional brake booster described above.

The regular brake pad generally has a convex characteristic curve as shown in FIG. 24. That is, deceleration is increased as the hydraulic pressure (output) is increased. However, when the hydraulic pressure is increase to a certain level, the driver is given a heavy feeling in the pedal operation during strong braking.

As mentioned above, when the booster characteristic of the brake booster according to the present embodiment and the brake pad characteristics are considered, the servo ratio is increased in the range in which the braking effect is decreased so as to increase a level of the pressing force in the present embodiment. As a result, according to the present embodiment, the braking characteristic (pressing force versus the deceleration characteristic) becomes substantially linear as shown in FIG. 25. Thus, the present embodiment can give the driver a linear feeling in the brake pedal operation. It should be noted that a double dashed chain line shown in FIG. 25 indicates the brake characteristic of the conventional apparatus.

The present embodiment has a simple construction in which the space 288 is formed in the recess 254 accommodating the reaction disk 286. Additionally, the contacting area $S_1$ between the rear surface of the reaction disk 286 and the valve body 228 can be changed by changing the diameter of the space 288. Thus, freedom in tuning of the brake feel can be improved.

Figure 26:
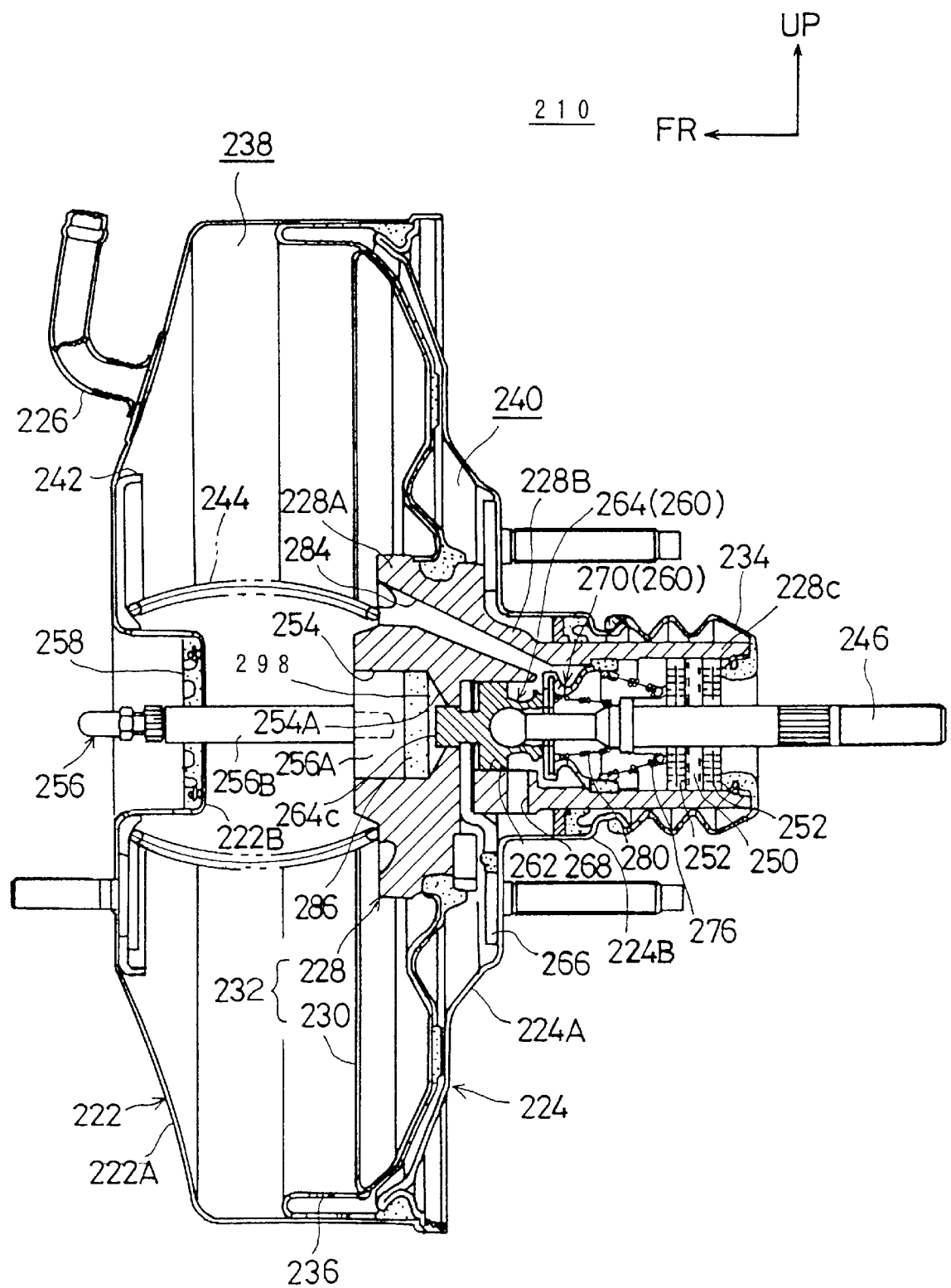
FIG. 26 is a cross-sectional view of a brake booster according to a fourth embodiment of the present invention.

A description will now be given of a fourth embodiment of the present invention. FIG. 26 is a cross-sectional view of a brake booster 210 according to the fourth embodiment of the present embodiment. In FIG. 26, parts that are the same as the parts shown in FIG. 15 are given the same reference numerals, and descriptions there of will be omitted. The construction of the brake booster 210 is the same as that of the brake booster 200 shown in FIG. 15 except for the shape of the space 288.

In the fourth embodiment, a tapered surface 254A having a predetermined taper angle is formed in the center of the recess 254 to form a space 298 of a conical shape. The space 298 constitutes means for increasing a servo ratio so that the servo ratio increases along a quadratic curve.

A through passage 290 is formed in the center of the valve body 228 in which the pressing portion 264C of the plunger 264 is slidably provided. An inner diameter of the space 298 at the left end in the figure is equal to the inner diameter of the recess 254. An inner diameter of the space 298 at the right end in the figure is equal to the inner diameter of the through passage 290. In the present embodiment, a tapered surface 254A between the left end and the right end has a predetermined angle. Additionally, an end of the pressing portion 264C protrudes inside the space 298 a predetermined distance when the pressing portion 264C of the plunger 264 is positioned in the through passage 290.

Figure 27A:
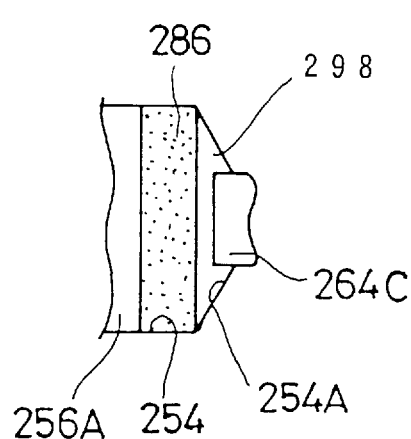
FIGS. 27A through 27D are illustrations for explaining an action of a reaction disk and a pressing portion shown in FIG. 26.
Figure 27B:
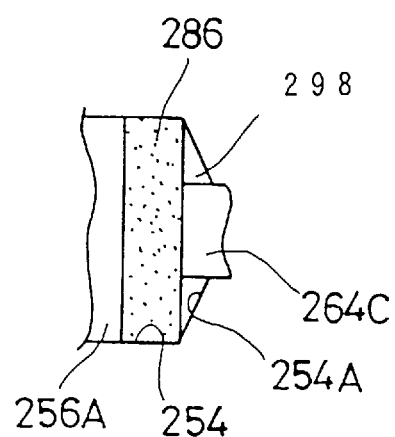
Figure 27C:
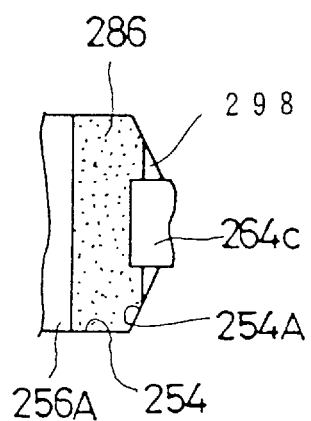
Figure 27D:
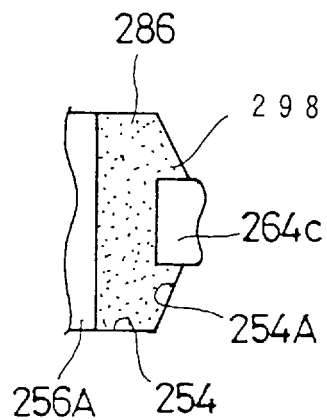

When a pressing force applied to the pedal 14 of the brake pedal 10 is small (low pressing force region), the reaction disk 286 protrudes to the middle of the space 298 as shown in FIG. 27C. Thus, a predetermined peripheral portion of the pressing portion 264C is covered by the reaction disk 286. When the pedal 14 is further pressed from this state, the reaction disk 286 protrudes within an entire gap as shown in FIG. 27D since reaction force from the master cylinder 32 is increased. This state is referred to as a high pressing force region. Thus, an entire periphery of the pressing portion 264C is covered by the reaction disk 286 in the space 298.

Accordingly, a contacting area $S_1$ between the rear surface of the reaction disk 286 and the recess 254 of the valve body 228 and the inner surface of the space 298 differs from that in the low pressing force region to that in the high pressing force region. Specifically, the contacting area $S_1$ is small in the low pressing force region, and the contacting area $S_1$ is large in the high pressing force region.

As a result, similar to the third embodiment, the servo ratio is represented by the following equation.

(servo ratio)=(contacting area $S_1$/contacting area $S_2$)+1

Where the contacting area $S_1$ is an area between the rear surface of the reaction disk and the power piston; the contacting area S2 is an area between the rear surface of the reaction disk and the plunger.

A change in the contacting area $S_1$, when the state of an operation of the brake booster is shifted from the low pressing force region to the high pressing force region, is responsive to the shape of the space 298. In the present embodiment, the space 298 is formed like a conical shape since the taper surface 254A is formed in the bottom of the recess 254. Accordingly, when the stale of the operation is shifted from the low pressing force region to the high pressing force region, the contacting area $S_1$ is gradually increased as shown in FIGS. 27C and 27D since the space 298 is gradually filled with the protruded reaction disk 286. Thus, the servo ratio is also gradually increased as the state of operation is shifted from the low pressing force region to the high pressing force region.

Figure 28:
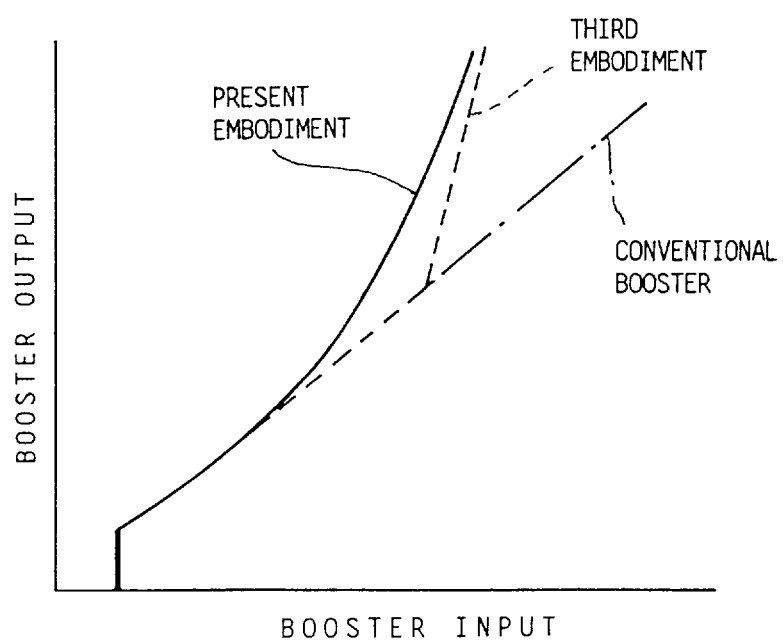
FIG. 28 is a graph representing a characteristic of the booster shown in FIG. 26.

FIG. 28 shows a graph representing a characteristic of the booster 210. In the graph of FIG. 28, a solid line curve represents a relationship between an input and an output of the booster 210. It should be noted that dashed lines represent the characteristic of the above-mentioned third embodiment, and a chain line represents the characteristic of the conventional booster. Since the servo ratio $R_P$ is the force input to the operating rod 246 to the output from the push rod 256, the servo ratio $R_P$ can be represented by the ratio of the booster input and the booster output. That is, the inclination of the curve shown in FIG. 28 represents the servo ratio $R_P$. As shown in FIG. 28, the booster output is gradually increased as the booster input is increased along a quadratic equation curve. This characteristic is obtained from the shape of the space 298 formed by the tapered surface 254A.

Figure 29:
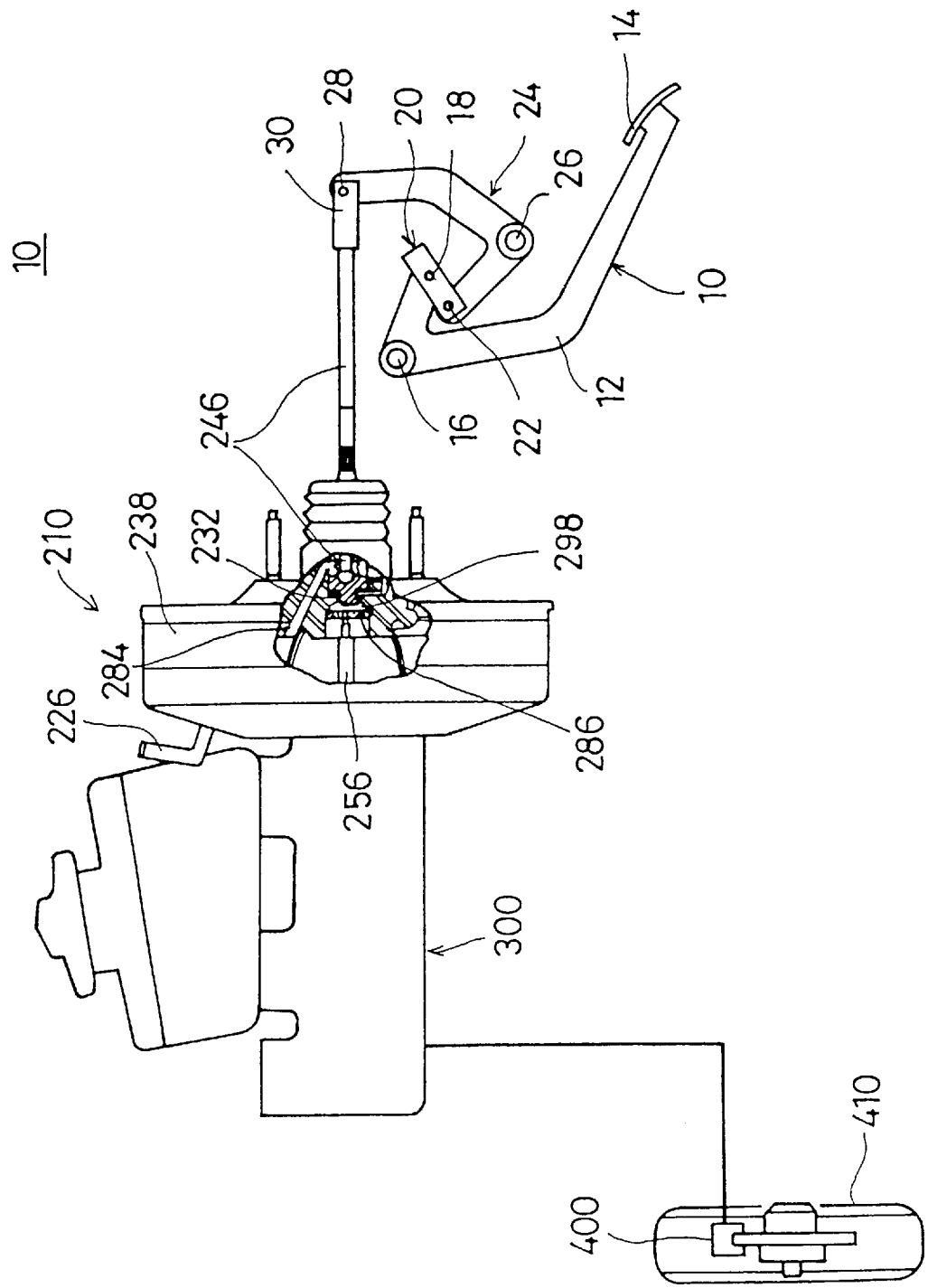
FIG. 29 is an illustration of a structure of a brake apparatus according to a fifth embodiment of the present invention.

A description will now be given of a fifth embodiment of the present embodiment. FIG. 29 is an illustration of a structure of a brake apparatus according to the fifth embodiment of the present invention. As shown in FIG. 29, the fifth embodiment of the present invention is a combination of the link mechanism shown in FIG. 5 and the brake booster 210 shown in FIG. 26.

As shown in FIG. 29, a pressing force applied to the pedal 14 is transmitted to the operating rod 246 of the brake booster 210 via the link mechanism, and is increased by the brake booster 210. The increased pressing force is supplied to a master cylinder 300 to convert the transmitted pressing force into a hydraulic pressure. The hydraulic pressure is supplied to a brake cylinder 400 provided for each wheel 410.

Figure 30:
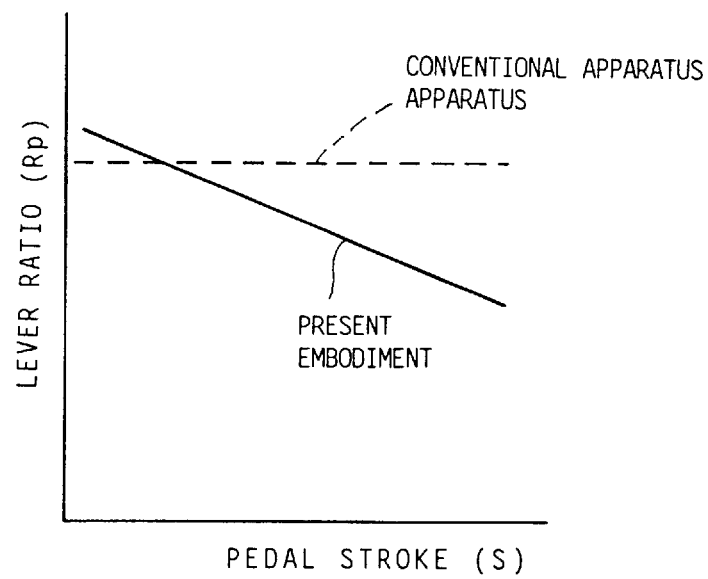
FIG. 30 is a graph representing a relationship between a pedal stroke and a lever ratio in the first embodiment.

As discussed above, in the brake apparatus according to the first embodiment, the lever ratio $R_P$ is gradually decreased as the pedal stroke is increased as shown in FIG. 30. This allows an easy adjustment of a brake in the effective region of the pedal stroke $S_P$.

Figure 31:
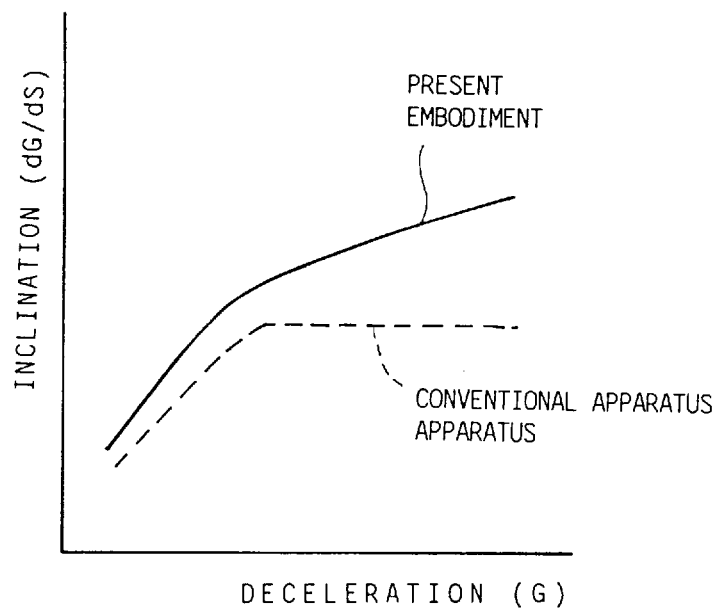
FIG. 31 is a graph representing a relationship between an inclination (dG/dS) of deceleration G against the stroke $S_P$ and deceleration G.

FIG. 31 shows a graph representing a relationship between an inclination (dG/dS) of deceleration G against the stroke $S_P$ and the deceleration G. Since the lever ratio $R_P$ is gradually decreased as the stroke $S_P$ is increased as shown in FIG. 29, the inclination (dG/dS) can be increased as compared to the conventional apparatus. The inclination (dG/dS) corresponds to a level of deceleration generated for a unit stroke. Thus, a greater brake force can be obtained as the inclination (dG/dS) is increased. In respect to brake feeling, a rigidity of the brake pedal 10 is improved when the inclination (dG/dS) is increased.

Figure 32:
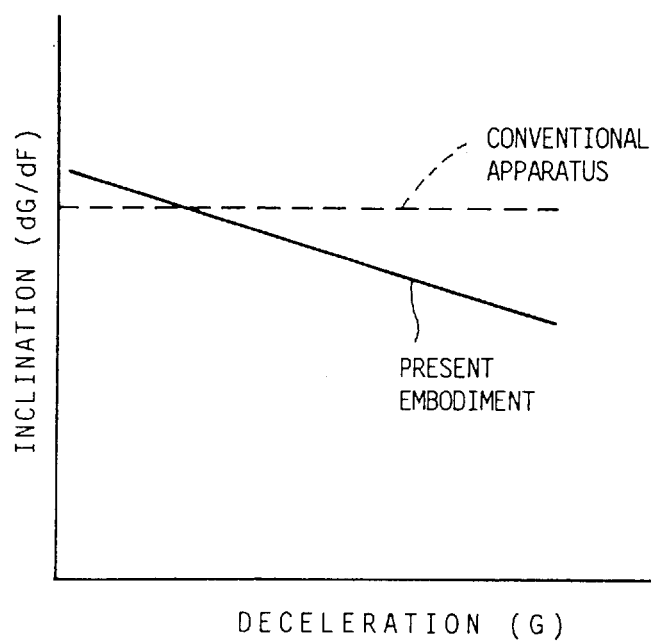
FIG. 32 is a graph representing a relationship between deceleration G and an inclination (dG/dF) of the deceleration G against a pressing force.

FIG. 32 is a graph representing a relationship between the deceleration G and an inclination (dG/dF) of the deceleration G against the pressing force F. The inclination (dG/dF) is a level of the deceleration generated for a unit pressing force. Thus, a greater brake force can be obtained as the smaller the inclination (dG/dF). In respect to brake feel, effectiveness of braking is improved when the inclination (dG/dF) is increased.

As shown in FIG. 32, in the characteristic of the brake apparatus having the link mechanism shown in FIG. 5, the inclination (dG/dF) is decreased as the deceleration G is increased. According to this characteristic, when the pedal 14 is strongly pressed, the effectiveness of braking is decreased and the pressing force required is increased. Accordingly, the first embodiment of the present invention can improve rigidity of brake feel but the required pressing force is increased. This may result in a deterioration in operability of the brake apparatus.

When the link mechanism having the above-mentioned characteristic is used in a brake apparatus having a sufficient brake power, a sufficient brake force may still be generated even when the inclination (dG/dF) is decreased and the feeling of the effectiveness of braking is decreased. Accordingly, the link mechanism according to the first embodiment is suitable for a brake apparatus capable of generating a sufficient brake power.

However, if the link mechanism shown in FIG. 5 is used for a brake apparatus having a capability of generating a less brake power, a sufficient brake power may not be obtained even when the pedal 14 is pressed to the end of its stroke. Thus, such design is not of practical use. It should be noted that the above-mentioned "sufficient brake power" refers to a condition in which a target deceleration G2 is sufficiently greater than a deceleration G1 generated by a pressing force applied to the pedal 14 (G2<<G1).

Figure 33:
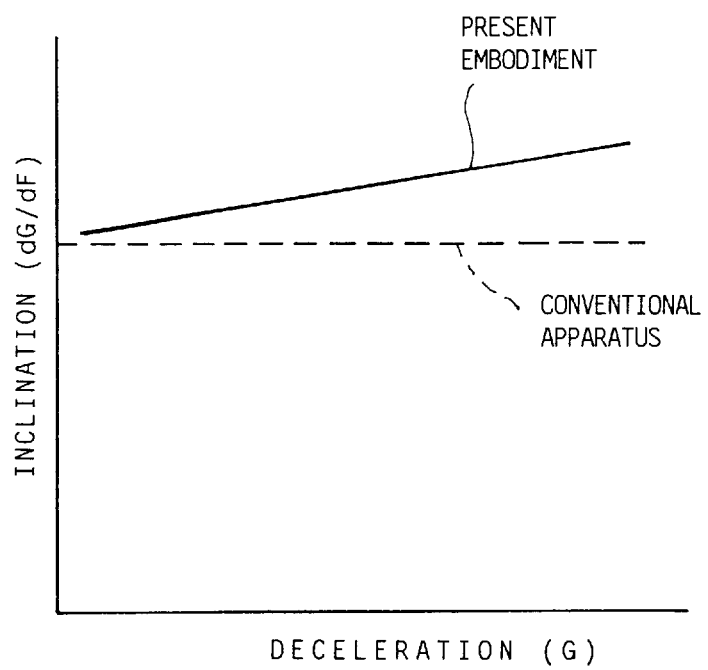
FIG. 33 is a graph representing a relationship between the deceleration G and an inclination (dG/dF) obtained by the brake booster 210 of the fourth embodiment.

On the other hand, FIG. 33 shows a graph representing a relationship between the deceleration G and an inclination (dG/dF) obtained by the brake booster 210 of the fourth embodiment. As mentioned above, the inclination (dG/dF) is a level of the deceleration generated for a unit pressing force. Thus, a greater brake force can be obtained the smaller the inclination (dG/dF). With respect to brake feeling, effectiveness of braking is improved when the inclination (dG/dF) is increased.

As shown in FIG. 33, the inclination (dG/dF) is increased as the deceleration G is increased as long as the brake booster 210 is concerned. This is caused by the servo ratio characteristic of the booster 210 which is increased as the booster input is increased as discussed previously with reference to FIG. 28. Accordingly, by using the brake booster 210 according to the fourth embodiment, the stroke of the pedal 14 does not affect the feeling of the effectiveness of braking, and thereby a stable feeling of the effectiveness of braking can be obtained irrespective of the stroke of the pedal 14.

However, the booster 210 cannot change the pedal stroke characteristic since the booster 210 can merely change the relationship between the pressing force F and the generated deceleration G. Accordingly, the rigidity of the pedal stroke cannot be improved by merely changing the characteristics of the brake booster 210.

Now, returning to FIG. 29, the description of the fifth embodiment is continued. The brake apparatus according to the fifth embodiment comprises, as described above, the link mechanism of the first embodiment and the brake booster 210 of the fourth embodiment. Thus, the characteristic as a whole is a sum of the characteristic of the brake apparatus according to the first embodiment and the characteristic of the brake apparatus according to the fourth embodiment.

Figure 34:
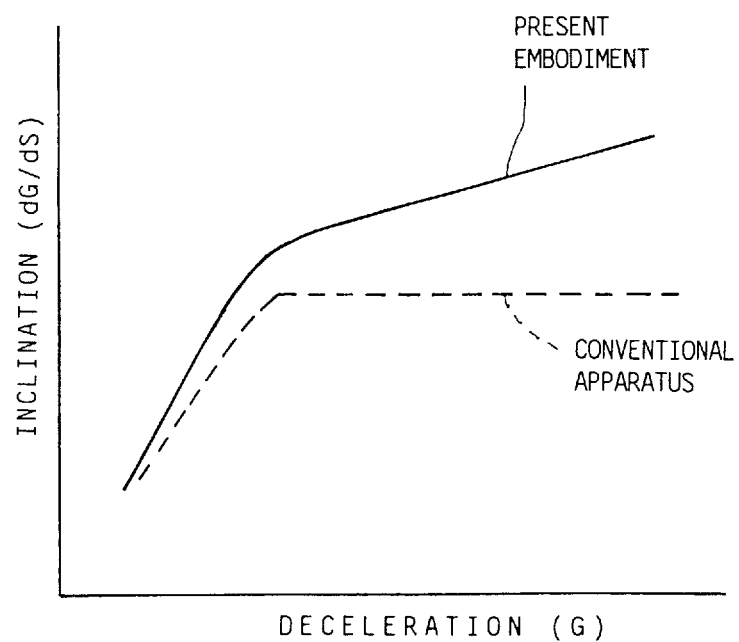
FIG. 34 is a graph representing a relationship between the deceleration G and an inclination (dG/dS) of the deceleration G against the pedal stroke $S_P$ in the fifth embodiment shown in FIG. 29.
Figure 35:
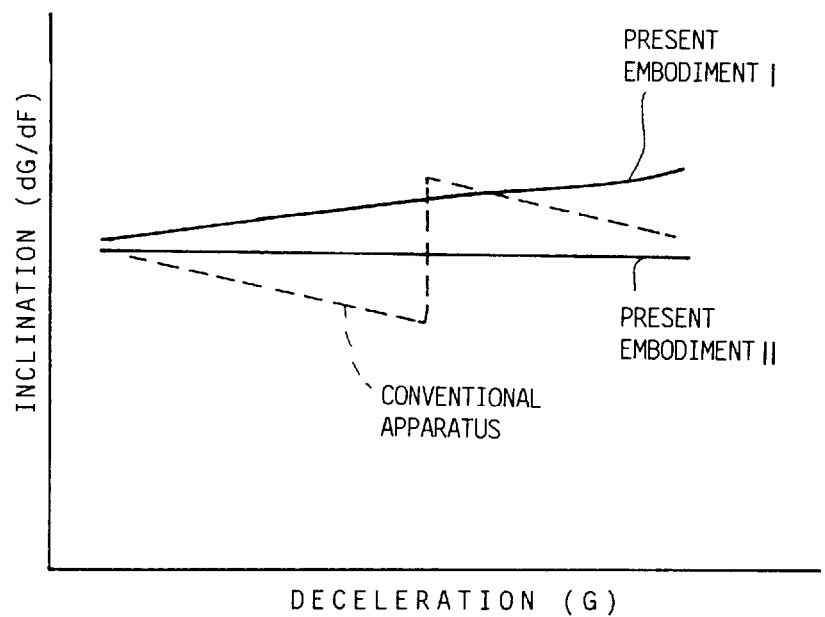
FIG. 35 is a graph representing a relationship between the deceleration G and an inclination (dG/dF) of the deceleration G against the pressing force F in the fifth embodiment.

FIG. 34 is a graph representing a relationship between the deceleration G and an inclination (dG/dS) of the deceleration G against the pedal stroke $S_P$ in the fifth embodiment shown in FIG. 29. FIG. 35 is a graph representing a relationship between the deceleration G and an inclination (dG/dF) of the deceleration G against the pressing force F in the fifth embodiment.

Referring now to the graph shown in FIG. 34, the inclination (dG/dS) in the present embodiment is determined by the characteristic of the link mechanism of the first embodiment since the brake booster 210 itself does not affect the pedal stroke characteristic. This is because the booster itself does not have a function to change the relationship between the pressing force F and the generated deceleration G.

Accordingly, the graph shown in FIG. 33 is similar to the corresponding graph of the first embodiment shown in FIG. 31. Thus the brake apparatus according to the fifth embodiment has an improved feeling of rigidity in the operation of the pedal 14 similar to the first embodiment.

On the other hand, referring to the graph shown in FIG. 35 which represents the inclination (dG/dF), the inclination (dG/dF) of the present embodiment becomes a sum of the brake pedal characteristic shown in FIG. 32 and the brake booster characteristic of the booster 210 shown in FIG. 33. As mentioned above, the inclination (dG/dF) of the brake apparatus according to the first embodiment is gradually decreased as shown in FIG. 32. On the other hand, the inclination (dG/dF) of the booster 210 is gradually increased as shown in FIG. 33. Accordingly, the characteristic shown in FIG. 35 is the characteristic shown in FIG. 32 and the characteristic shown in FIG. 35.

In the present embodiment, a rate of increase and decrease of the characteristic between the inclination (dG/dF) and the deceleration G of the booster 210 shown in FIG. 33 is greater than that of the characteristic between the inclination (dG/dF) and the deceleration G of the first embodiment shown in FIG. 32. The above-mentioned rate of increase and decrease may be varied as desired so that the characteristic between the inclination (dG/dF) and the deceleration G shown in FIG. 35 is changed to be constant against the deceleration G (present embodiment I), or increased linearly (present embodiment II) as shown in FIG. 35.

In the conventional brake apparatus, as shown by dashed line in FIG. 35, the servo ratio characteristic has a sharp change. Thus, the characteristic between the inclination (dG/dF) and the deceleration G is varied in a wide range. However, in the brake apparatus according to the present embodiment, the characteristic between the inclination (dG/dF) and the deceleration G is stable as mentioned above because the servo ratio characteristic exhibits a quadratic equation curve, and thus a stable feeling of braking can be obtained irrespective of the pedal stroke $S_P$.

In order to obtain the constant or linearly increasing characteristic between the inclination (dG/dF) and the deceleration G as shown in FIG. 35, the characteristic of the link mechanism of the first embodiment and the characteristic of the booster of the fourth embodiment must be appropriately set.

The characteristic of the first embodiment can be changed by changing the lever ratio. Specifically, the lever ratio can be changed by changing the length of each member such as L1, R1, Rm, L2 and LB. This will change the characteristic between the inclination (dG/dF) and the deceleration G. In the brake booster 210, the characteristic between the inclination (dG/dF) and the deceleration G can be changed by changing the shape of the space 298 as described previously.

Thus, the brake apparatus according to the present embodiment can achieve the constant or linearly increasing characteristic in a relatively simple construction by appropriately adjusting the characteristic of the link mechanism and the booster.

As apparent from the above discussion, the characteristic of the brake apparatus according to the present embodiment has preferable characteristics from both the link mechanism and the booster. Thus, the brake apparatus according to the present embodiment has both rigid feeling and the stable feeling of effectiveness of braking irrespective of the pedal stroke. Thus, the brake feel as a whole is improved.

Figure 36:
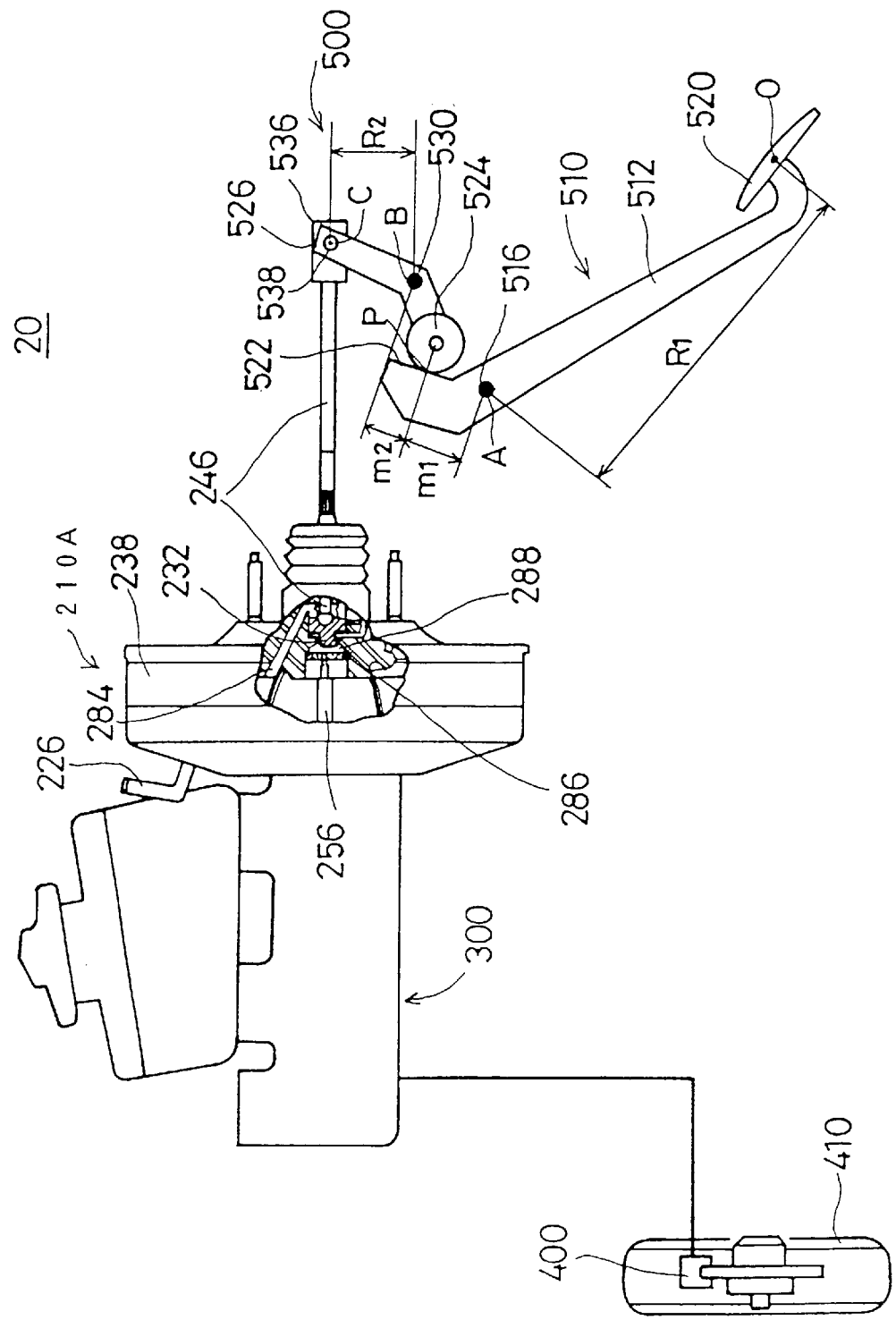
FIG. 36 is an illustration of a brake apparatus according to a sixth embodiment of the present invention.

A description will now be given of a sixth embodiment of the present invention. FIG. 36 is an illustration of a brake apparatus according to the sixth embodiment of the present invention. In FIG. 36 parts that are the same as the parts shown in FIG. 29 are given the same reference numerals, and descriptions thereof will be omitted. In the brake apparatus according to the sixth embodiment, the link mechanism of the first embodiment is replaced by a link mechanism 500 and the brake booster 210 is replaced by a brake booster 210A.

As shown in FIG. 36, a brake pedal 510 comprises a lever portion 512 and a pedal 520 formed on an end of the lever portion 512. The lever portion 512 is pivotally supported on a bracket (not shown) by a support shaft 516. When the pedal 520 is pressed, the lever portion is pivoted about the support shaft 516. An opposite end of the lever portion has a cam surface 522.

A roller 524 as a cam follower contacts the cam surface 522 of the lever portion 512. The roller 524 is rotatably mounted on an end of a lever 526. The lever 526 is pivotally mounted on the bracket by a support shaft. 530. A spring (not shown) is provided between the lever 526 and the lever portion 512 of the brake pedal 510 so that the cam surface 522 is always in contact with the roller 524.

A yoke 536 of the operating rod 246, which is an output member, is pivotally mounted on the other end of the lever 526 by a pin 538. That is, the rear end of the operating rod 246 is connected to the lever portion 512 of the brake pedal 510 via the lever 526. The operation rod 246 is connected to the master cylinder 300 via the brake booster 200A.

Figure 37:
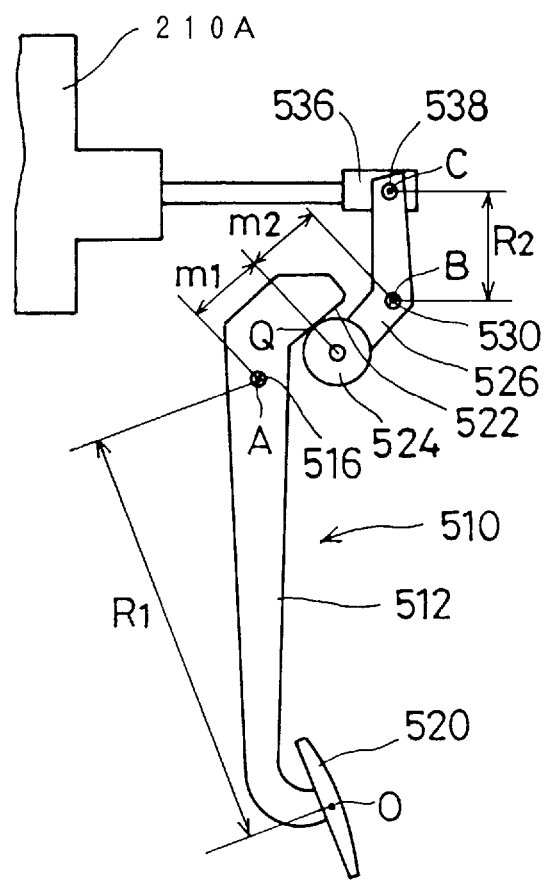
FIG. 37 is a side view of the link mechanism shown in FIG. 36 in a state where a pedal is slightly pressed.
Figure 38:
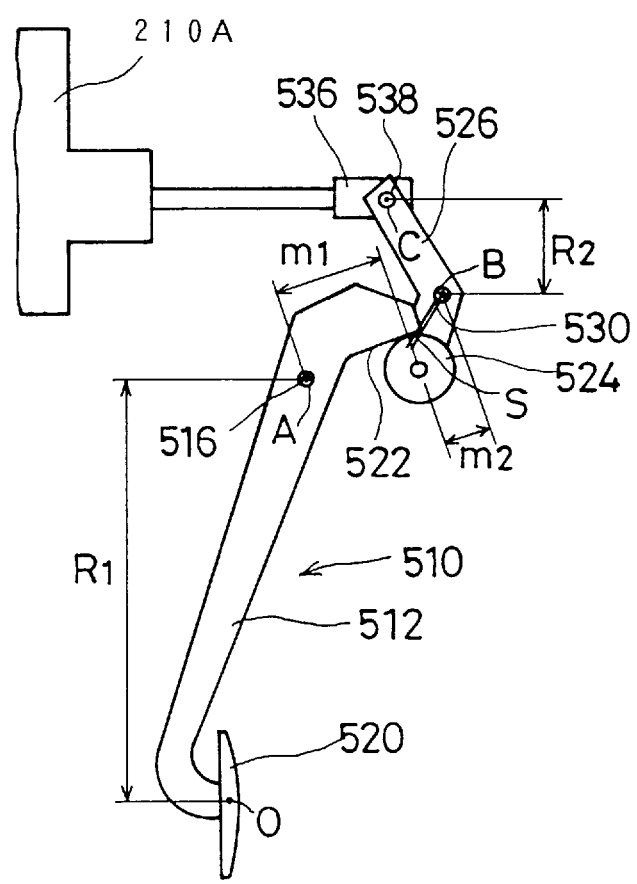
FIG. 38 is a side view of the link mechanism shown in FIG. 36 in a state where the pedal is at the end of stroke.

It should be noted that the link mechanism shown in FIG. 36 is in a state where the pedal 512 is at an initial position. FIG. 37 is a side view of the link mechanism 500 shown in FIG. 36 in a state where the pedal 512 is slightly pressed. FIG. 38 is a side view of the link mechanism 500 in a state where the pedal 512 is at the end of the stroke.

When the pedal 512 is pressed by a driver, the cam surface 522 presses the roller 524 at a contact point P as shown in FIG. 36. Thus, the pressing force is transmitted to the operating rod 246. This pressing force actuates the brake booster 210A so that an increased force is transmitted to the master cylinder 300 by the brake booster 210A.

As apparent from FIG. 36, when the brake pedal 510 is in the initial position, the cam surface of the lever portion 512 contacts the roller 524 of the lever 526 at the point P. Accordingly, the lever ratio of the whole brake apparatus, when the brake pedal 510 is in the initial position, is represented approximately by (R1/R2)×(m2/m1), where R1 is a distance between the center O of the pedal 520 and the center A of the support shaft 516; R2 is a distance between the center B of the support shaft 530 and the center C of the pin 538; m1 is a distance between the center A of the support shaft 516 and the contact point P; m2 is a distance between the contact point P and the center B of the support shaft 530; m1 is greater than m2 (m1>m2).

As apparent from FIG. 37, when the brake pedal 510 is in an initial stage of a braking operation, the lever 526 is pivoted about the support shaft 530 due to engagement of the roller 524 with the cam surface 522. Thus, the contact point between the cam surface 522 and the roller 524 is shifted to a point Q. Accordingly, the distance m1 is decreased while the distance m2 is increased. Thus the lever ratio is increased from the state where the pedal 512 is at the initial position to the state where the pedal 512 is pressed to the initial stage at which braking effect starts.

When the pedal 512 is pressed to the end of its stroke as shown in FIG. 38, the contacting point between the cam surface 522 and the roller 524 is shifted to a point S. Accordingly, the distance m1 is increased and the distance m2 is decreased as compared to that when the pedal is at the initial stage shown in FIG. 37. Thus, the lever ratio is decreased again.

Figure 39:
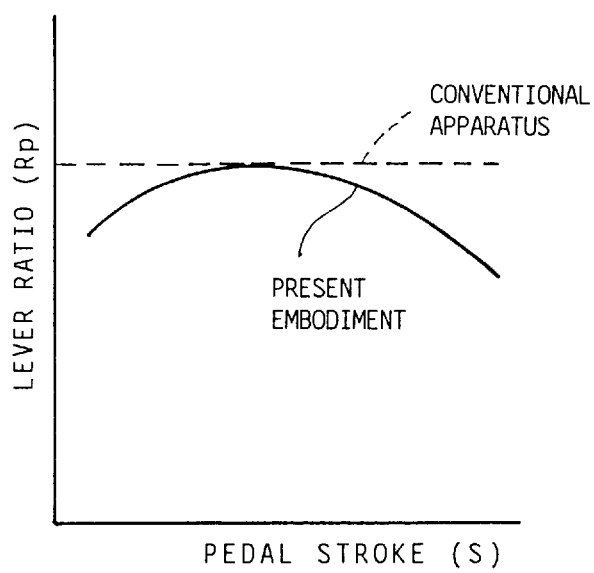
FIG. 39 is a graph representing a relationship between a lever ratio $R_P$ and a pedal stroke $S_P$.
Figure 40:
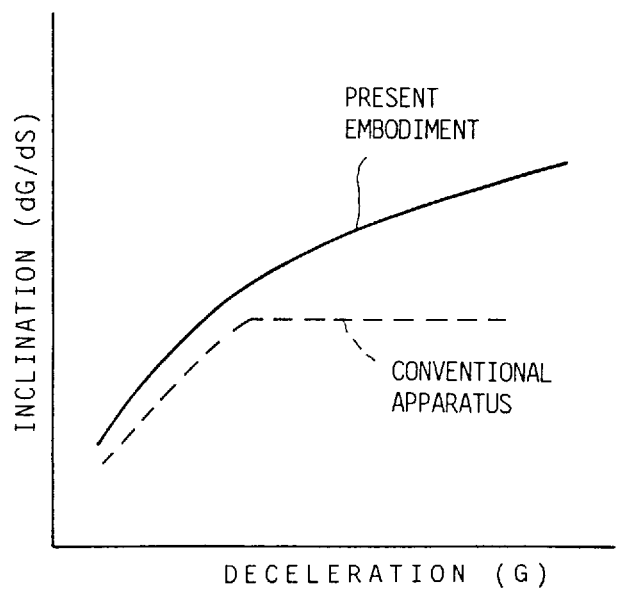
FIG. 40 is a graph representing a relationship between the deceleration G and the inclination (dG/dS) of the deceleration G against the pedal stroke $S_P$.
Figure 41:
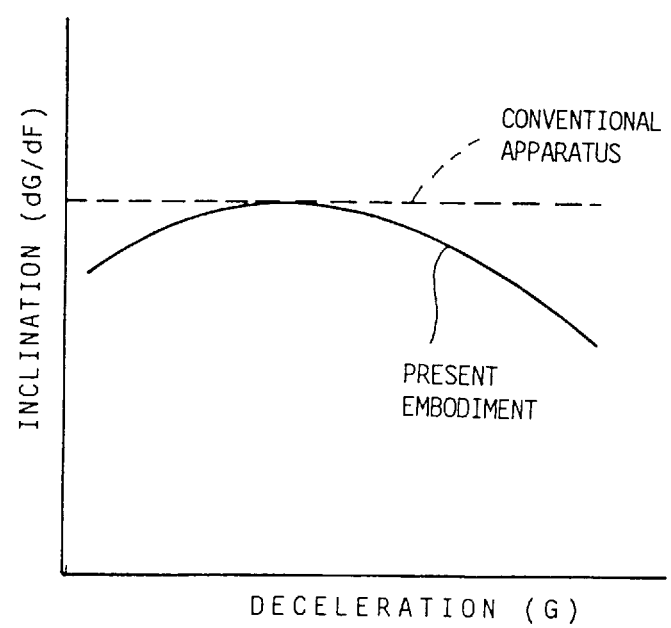
FIG. 41 is a graph representing a relationship between the deceleration G and the inclination (dG/dF) of the deceleration G against the pressing force F.

FIG. 39 is a graph representing a relationship between the lever ratio $R_P$ and the pedal stroke $S_P$. In FIG. 20, dashed lines represents a characteristic of a conventional brake apparatus in which the lever ratio is not varied against the pedal stroke. The characteristic shown in FIG. 39 and also in FIGS. 40 and 41 are obtained on the assumption that the coefficient $\mu$ of friction of each brake 400 is constant.

As apparent from the figure, the characteristic of the brake apparatus having the link mechanism 500 is such that the lever ratio is decreased as compared to that of the conventional brake apparatus when the pedal stroke $S_P$ is in the initial stage, that is, for example, 0–10 mm. Thus, the idle stroke from the initial position to the point where the brake is actually effected can be set to achieve a rapid completion of the first fill.

The lever ratio $R_P$ is increased in the normal braking region such as light braking where the pedal is pressed further from the above-mentioned initial stage or medium braking (for example, the pedal stroke of about 30–45 mm). Accordingly, the increase in a hydraulic pressure in the master cylinder per unit stroke is decreased, and thus a stable deceleration can be obtained since a deviation in the pedal stroke is decreased. This improves controllability of the brake apparatus.

Additionally, during a strong braking (for example, the pedal stroke of about 50 mm), the lever ratio $R_P$ of the link mechanism 500 in the brake apparatus according to the present embodiment is gradually decreased, a sufficient rigidity can be given to the driver, resulting in an improvement in the operation feeling.

FIG. 40 is a graph representing a relationship between the deceleration G and the inclination (dG/dS) of the deceleration against the pedal stroke $S_P$. As shown in FIG. 40, the inclination (dG/dS) can be increased as compared to the conventional apparatus by gradually increasing the lever ratio in a region from medium braking to the end of the pedal stroke (the strong braking region) as shown in FIG. 39. Since a greater brake force can be obtained by a less stroke as the inclination (dG/dS) is large. Thus, the link mechanism 500 of the brake apparatus according to the present embodiment can improve the rigid feeling of the operation of the brake pedal 510.

FIG. 41 is a graph representing a relationship between the deceleration G and the inclination (dG/dF) of the deceleration G against the pressing force F. As discussed above, the inclination (dG/dF) represents a level of deceleration for a unit pressing force. Thus, a greater brake force can be obtained by a smaller pressing force as the inclination (dG/dF) is increased. Accordingly, in the view point of brake feeling, effectiveness of braking when the brake pedal is operated can be improved due to the increase in the inclination (dG/dF) of the deceleration G against the pressing force F.

However, as shown in FIG. 41, in the link mechanism 500 of the brake apparatus according to the present embodiment, the inclination (dG/dF) has a peak in the medium braking region and is decreased toward each end thereof. Thus, the feeling of effectiveness of braking is decreased and the required pressing force is increased near the end of the pedal stroke of the brake pedal 510.

Figure 42:
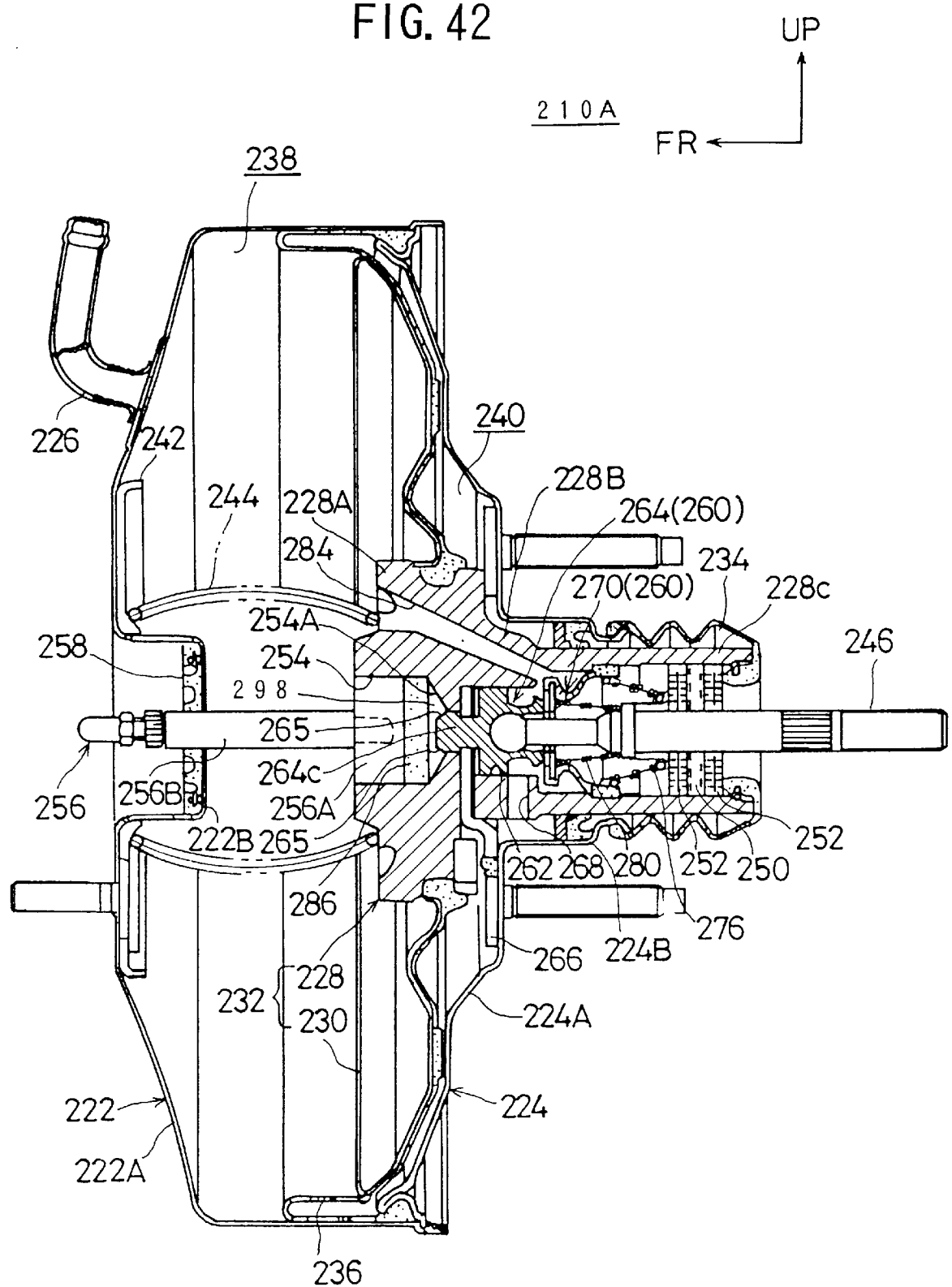
FIG. 42 is a cross-sectional view of a brake booster according to the sixth embodiment of the present invention.

A description will now be given of the brake booster 210A. The brake booster 210A has a construction the same as the brake booster 210 according to the fourth embodiment of the present invention except for the shape of the end of the pressing portion 264C of the plunger 264. FIG. 42 is a cross-sectional view of the brake booster 210A according to the sixth embodiment of the present invention. In FIG. 42, parts that are the same as the parts shown in FIG. 26 are given the same reference numerals, and descriptions thereof will be omitted.

As shown in FIG. 42, the plunger 264 is accommodated in the recess 262 formed in the main body 228A of the intermediate part 228B of the valve body 228. The plunger comprises the plunger main body 264A, the neck portion 264B, the pressing portion 264C and the atmospheric pressure valve 264D.

In the above-mentioned fourth embodiment, the pressing portion 264C has a cylindrical shape (refer to FIG. 16). In the present embodiment, the pressing portion 264C has tapered surface 265 at the end thereof.

Similar to the fourth embodiment, the reaction disk 286 is provided in the recess 254 formed in the valve body 254. Since the recess 254 has a cylindrical shape having a predetermined inner diameter and the reaction disk 286 has an outer diameter substantially equal to the inner diameter of the recess 254, the reaction disk 286 is fit in the bottom of the recess 254.

The reaction disk 286 functions to provide a predetermined servo ratio by distributing a reaction force from the master cylinder 300 during a braking operation to the power piston 232 and the plunger 264. The reaction disk 286 also has a function to provide a predetermined jumping function by being separated from the plunger 264 during the initial stage of the braking operation.

Similarly to the fourth embodiment, the space 298 is formed in the bottom of the recess 254. Additionally, as mentioned above, the end of the pressing portion 265 is formed with a tapered surface 265. The pressing portion having the tapered surface 265 cooperates with the space 298 to provide means for increasing a servo ratio so that a continuous characteristic curve is obtained.

A description will now be given, with reference to FIGS. 43A through 43D, of an operation of the brake booster 210A.

Figure 43A:
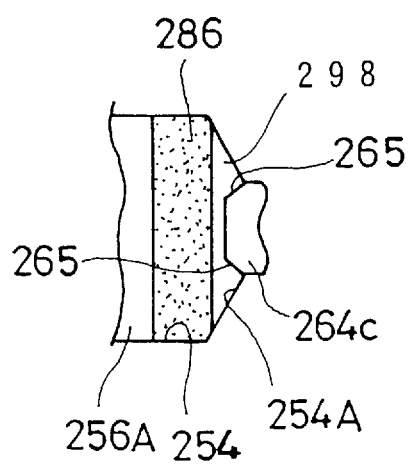
FIGS. 43A through 43D are illustrations for explaining an operation of a reaction disk and a tapered surface of a pressing portion shown in FIG. 42.

During a non-braking operation when the brake pedal is not operated by a driver, the power piston 232 is pressed to the bottom of the base 224A of the rear shell due to the pressing force of the return spring 244 as shown in FIG. 42. Thus, in this state, the brake booster 210A is not operated. Additionally, in this state, as shown in FIG. 43A, the pressing portion 264C of the plunger 264 is positioned within the gap 298, but it is not in contact with the rear surface of the reaction disk 286.

Figure 43B:
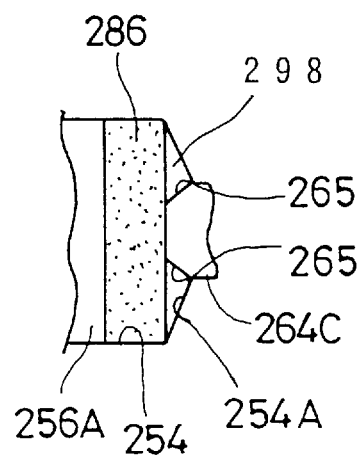

When the brake pedal 510 is operated in this state, and a force is applied to the operating rod 246 as shown in FIG. 43B, the power piston 232 is positioned still in the initial position. However, the push rod 256 is pressed toward the left side in the figure against the pressing force of the return spring 276. Thus, the pressing portion 264C of the plunger 264 contacts the rear surface of the reaction disk 286 as shown in FIG. 43B. In this case, the pressing force applied to the brake pedal 510 is transmitted to the push rod 256 after it is converted according to the lever ratio and via the operating rod 246, the plunger 264 and the reaction disk 286. That is, the brake booster 210A is in an operated state.

When the brake pedal 510 is further pressed and the operating rod 246 is supplied with the pressing force, the push rod 256 is further pressed to the left side in the figure as shown in FIG. 20. The atmospheric pressure valve 264D of the plunger 264 is separated from the vacuum valve 270A of the poppet 270. Thus, the atmospheric pressure is introduced into the cylindrical part 228C via the air filters 252 and the silencer 250, and further into the atmospheric pressure chamber 240 via the atmosphere passage 268. Thereby, a pressure difference is generated between the negative pressure chamber 238 and the atmospheric pressure chamber 240, and the foot brake force input by the driver through the link mechanism 500 is increased by the brake booster 210A.

A discussion will be made of an operation of the reaction disk 286 in the space 298 during the operated state.

Figure 43C:
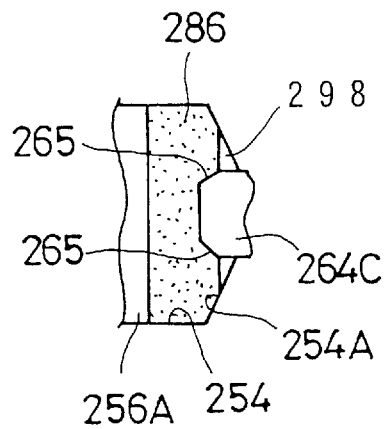

As shown in FIG. 43C, when a pressing force applied to the pedal 514 of the brake pedal 510 is small (low pressing force region), the reaction disk 286 protrudes to the middle of the space 298. Thus, a predetermined portion of the tapered surface 265 of the pressing portion 264C is covered by the reaction disk 286.

Figure 43D:
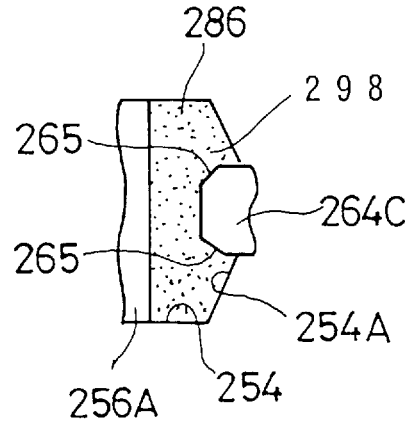

When the pedal 514 is further pressed from this state, the reaction disk 286 protrudes within an entire gap as shown in FIG. 43D since reaction force from the master cylinder 300 is increased. This state is referred to as a high pressing force region. Thus, the entire periphery of the pressing portion 264C including the tapered surface 265 is covered by the reaction disk 286 in the space 298.

Accordingly, similar to the fourth embodiment, a contacting area $S_1$ between the rear surface of the reaction disk 286 and the recess 254 of the valve body 228 and the inner surface of the space 288 differs from that in the low pressing force region to that in the high pressing force region.

A change in the contacting area $S_1$, when an operation state of the brake booster is shifted from the low pressing force region to the high pressing force region, is responsive to the shape of the space 298. In the present embodiment, the space 298 is formed as a conical shape since the taper surface 254A is formed in the bottom of the recess 254. Additionally, the tapered surface 265 is formed on the pressing portion 264C.

Accordingly, when the operation state is shifted from the low pressing force region to the high pressing force region, the contacting area $S_1$ is gradually increased as shown in FIGS. 43C and 43D since the space 298 is gradually filled with the protruded reaction disk 286. Thus, the servo ratio is also gradually increased as the state of operation is shifted from the low pressing force region to the high pressing force region.

Figure 44:
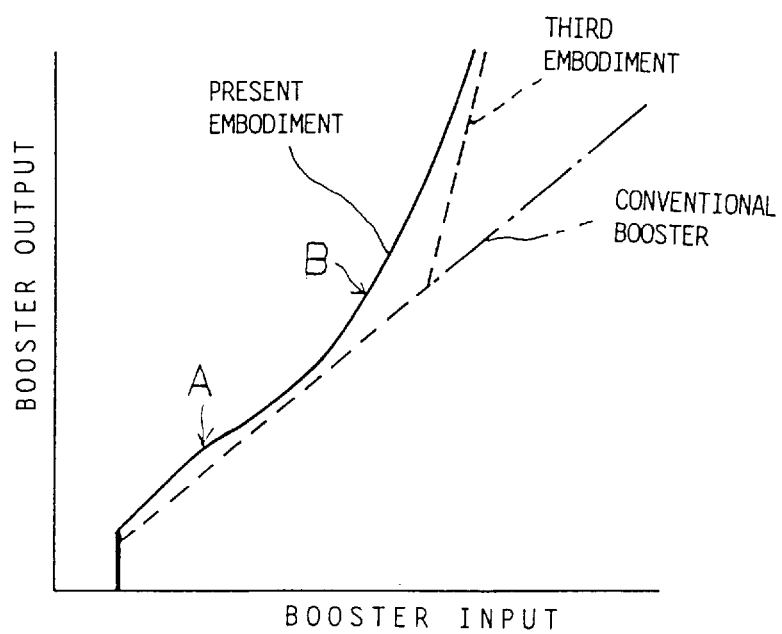
FIG. 44 is a graph representing a characteristic of the brake booster shown in FIG. 42.
Figure 45:
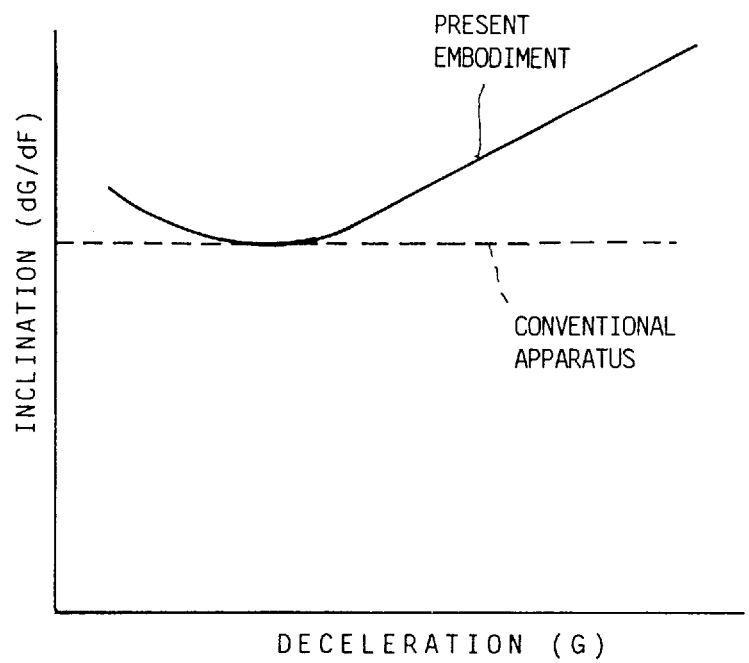
FIG. 45 is a graph representing a relationship between deceleration G and an inclination (dG/dF) of the deceleration G against a pressing force.

FIGS. 44 and 45 are graphs representing a characteristic of the booster 210A. In the graphs of FIG. 44, a solid line curve represents a relationship between an input and an output of the booster 210A. It should be noted that dashed lines represent the characteristic of the above-mentioned third embodiment, and a chain line represents the characteristic of the conventional booster. Since the servo ratio $R_P$ is the force input to the operating rod 246 to the output from the push rod 256, the servo ratio $R_P$ can be represented by the ratio of the booster input and the booster output. That is, the inclination of the curve shown in FIG. 44 represents the servo ratio $R_P$.

As shown in FIG. 44, the booster output is gradually increased as the booster input is increased along a cubic equation curve. Specifically, a convex characteristic curve shown in a portion of the characteristic curve indicated by an arrow A in FIG. 23 is generated by the reaction disk 286 being protruded in the middle of the space 298 and a portion of the tapered surface 265 being covered by the reaction disk 286. Additionally, a concave curve show in a portion of the characteristic curve indicated by an arrow B is generated by the reaction disk being filled in an entire space 298 and the entire periphery of the pressing portion 264C being covered by the reaction disk. The servo ratio characteristic of the brake booster 210A as a whole is increased as the booster input is increased.

This characteristic is achieved by the cooperation of the shape of the space 298 formed by the tapered surface 254A and the tapered surface 265 being formed on the pressing portion 264C. That is, The contacting area $S_1$ between the rear surface of the reaction disk 286 and the inner surface of the recess 254 and the space 298 is gradually increased by the cooperation of the tapered surface 265 of the pressing portion 264C and the tapered surface 254A of the space 298. Thus, the servo ratio also exhibits the characteristic that gradually increases in relation to the configuration of the tapered surfaces 254A and 265, that is, the characteristic gradually increasing along a cubic equation curve as discussed above.

On the other hand, FIG. 45 shows a graph representing a relationship between the deceleration G and an inclination (dG/dF) of the deceleration G against the pressing force F. As maintained above, the inclination (dG/dF) is a level of the deceleration G generated for a unit pressing force F. Thus, a greater brake force can be obtained as smaller the inclination (dG/dF). In respect to brake feeling, effectiveness of braking is improved when the inclination (dG/dF) is increased.

As shown in FIG. 45, the inclination (dG/dF) is gradually increased with a minimum value at a certain level of the deceleration. This is caused by the servo ratio characteristic of the booster 210A which is increased as the booster input is increased along a cubic equation curve.

Accordingly, by using the brake booster 210A provided in the brake apparatus according to the sixth embodiment, the stroke of the pedal 514 does not affect the feeling of the effectiveness of braking, and thereby a stable feeling of the effectiveness of braking can be obtained irrespective of the stroke of the pedal 514.

However, similar to the fifth embodiment, the booster 210A cannot change the pedal stroke characteristic: since the booster 210A can merely change the relationship between the pressing force F and the generated deceleration G. Accordingly, the rigidity of the pedal stroke cannot be improved by merely changing the characteristics of the brake booster 210A.

Now, returning to FIG. 43, the description of the sixth embodiment is continued. The brake apparatus according to the sixth embodiment comprises, as described above, the link mechanism 500 and the brake booster 210A. Thus, the characteristic as a whole is a sum of the characteristic of the brake apparatus according to the link mechanism 500 and the characteristic of the brake booster 210A.

Figure 46:
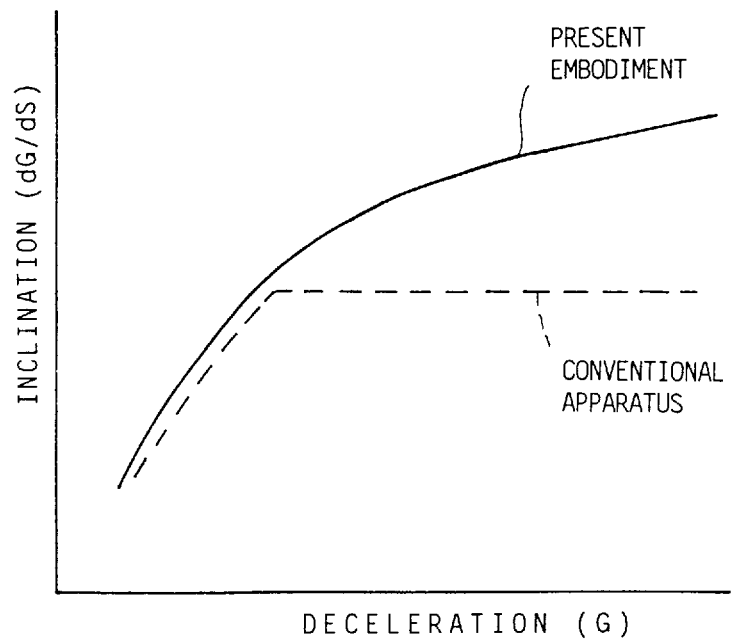
FIG. 46 is a graph representing a relationship between the deceleration G and an inclination (dG/dS) of the deceleration G against the pedal stroke $S_P$ in the sixth embodiment shown in FIG. 36.
Figure 47:
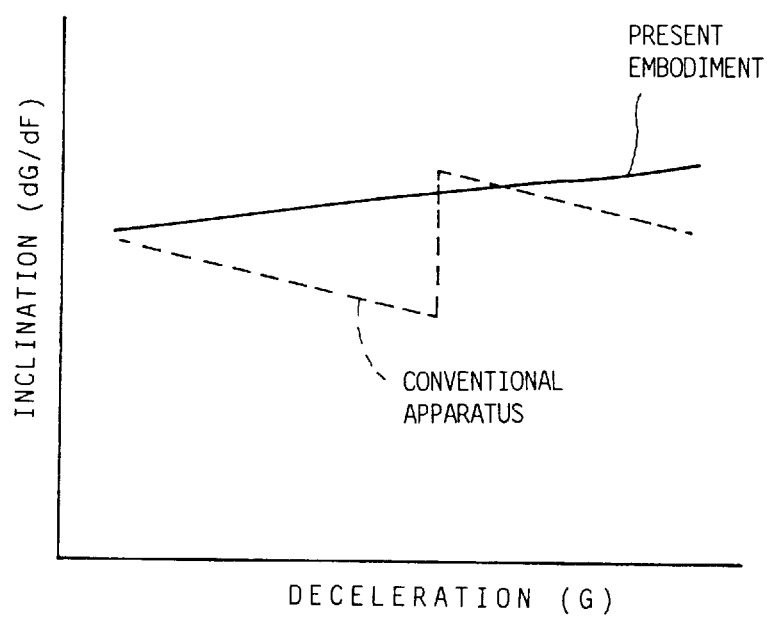
FIG. 47 is a graph representing a relationship between the deceleration G and an inclination (dG/dF) of the deceleration G against the pressing force F in the sixth embodiment.

FIG. 46 is a graph representing a relationship between the deceleration G and an inclination (dG/dS) of the deceleration G against the pedal stroke $S_P$ in the sixth embodiment shown in FIG. 36. FIG. 47 is a graph representing a relationship between the deceleration G and an inclination (dG/dF) of the deceleration G against the pressing force F in the sixth embodiment.

Referring now to the graph shown in FIG. 46, the inclination (dG/dS) in the present embodiment is determined by the characteristic of the link mechanism 500 since the brake booster 210A itself does not affect the pedal stroke characteristic. This is because the booster itself does not have a function to change the relationship between the pressing force F and the generated deceleration G.

Accordingly, the graph shown in FIG. 46 is similar to the corresponding graph of the link mechanism 500 shown in FIG. 40. Thus the brake apparatus according to the sixth embodiment has an improved feeling of rigidity in the operation of the pedal 514 similarly to the fifth embodiment.

On the other hand, referring to the graph shown in FIG. 47 which represents the inclination (dG/dF), the inclination (dG/dF) of the present embodiment becomes a sum of the characteristics of the link mechanism 500 shown in FIG. 41 and the brake booster characteristic of the booster 210A shown in FIG. 45.

As mentioned above, the inclination of (dG/dF) of the brake apparatus according to the fifth embodiment is gradually decreased with a peak at a certain deceleration as shown in FIG. 41. On the other hand, the inclination (dG/dF) of the booster 210A is gradually increased as shown in FIG. 45. Accordingly, the characteristic shown in FIG. 47 is a sum of the characteristic shown in FIG. 41 and the characteristic shown in FIG. 45.

In the present embodiment, a rate of increase and decrease of the characteristic between the inclination (dG/dF) and the deceleration G of the booster 210A shown in FIG. 45 is greater than that of the characteristic between the inclination (dG/dF) and the deceleration G of the link mechanism 500 shown in FIG. 41. The above-mentioned rate of increase and decrease may be varied as desired so that the characteristic between the inclination (dG/dF) and the deceleration G shown in FIG. 37 is changed to be constant against the deceleration G, or increased linearly. The graph of FIG. 47 shows the linearly increasing characteristic. Accordingly, in the brake apparatus according to the present embodiment, the characteristic between the inclination (dG/dF) and the deceleration G is stable, and thus a stable feeling of braking can be obtained irrespective of the pedal stroke $S_P$.

In order to obtain the constant or linearly increasing characteristic between the inclination (dG/dF) and the deceleration G as shown in FIG. 47, the characteristic of the link mechanism 500 and the characteristic of the booster 210A must be appropriately set.

The characteristic of the link mechanism 500 can be changed by changing the lever ratio. Specifically, the lever ratio can be changed by changing the length of each member such as R1 and R2. This will change the characteristic between the inclination (dG/dF) and the deceleration G. In the brake booster 210A, the characteristic between the inclination (dG/dF) and the deceleration G can be changed by changing the configuration of the tapered surfaces 254A and 265 as described previously.

Thus, the brake apparatus according to the present embodiment can achieve the constant or linearly increasing characteristic in a relatively simple construction by appropriately adjusting the characteristic of the link mechanism 500 an the booster 210A.

As apparent from the above discussion, the characteristic of the brake apparatus according to the present embodiment has preferable characteristics from both link mechanism and the booster. Thus, the brake apparatus according to the present embodiment has both rigid feeling and the stable feeling of effectiveness of braking irrespective of the pedal stroke. Thus, the brake feel as a whole of the brake apparatus is improved.

It should be noted that a combination of the link mechanism and the brake booster of the above-mentioned embodiments other that the combinations described in the above-mentioned fifth and sixth embodiments may be effective to obtain an appropriate characteristics of a brake apparatus as a whole.

The present invention is not limited to the specifically disclosed embodiments, and variations and modifications may be made without departing from the scope of the present invention.

What is claimed is:

1. A brake apparatus for a vehicle comprising a link mechanism and a power generating unit generating a hydraulic pressure to each wheel of said vehicle, said link mechanism comprising:

a brake pedal including a lever portion having a first end and a second end, a pedal provided on said first end, said lever portion being pivotally supported at a pivot point between said first and second ends;

a pivot link having a first end and second end, said second end of said pivot link connected to a force transmission member connected to said power generating unit, said pivot link being pivotally supported at a pivot point between said first and second ends of said pivot link; and a connection link having a first end and a second end, said first end of said connection link connected to said second end of said lever portion of said brake pedal, said second end of said connection link connected to said first end of said pivot link, wherein travel of said pedal of said brake pedal is transmitted to said force transmission member via said connection link so that a lever ratio of said link mechanism is changed while said pedal travels from an initial position to a stroke end position, said lever ratio defined as a ratio of a rate of change in movement of said pedal to a rate of change in movement of said force transmission member.

2. The brake apparatus as claimed in claim 1, wherein said lever portion of said brake pedal is supported by a pivot shaft mounted on a pedal support fixed to a stationary member of said vehicle, said pedal support having a first end extending to a position below said pivot shaft.

3. The brake apparatus as claimed in claim 2, wherein said stationary member separates an engine compartment from a passenger compartment of said vehicle, said power generating unit having a booster increasing a power input by said link mechanism, said pedal support having a second end opposite to said first end of said pedal support extending to a position below said pivot shaft, said second end of said pedal support fixed to said booster.

4. A brake apparatus for a vehicle comprising a link mechanism and a power generating unit generating a hydraulic pressure to each wheel of said vehicle, a brake booster being provided between said link mechanism and said power generating unit to increase an input force input from said link mechanism to said power generating unit by operation of a negative pressure generated in an air intake system of an engine provided in said vehicle, said brake booster comprising:

an operating rod connected to said link mechanism so that the input force is input from said link mechanism;

a push rod connected to said power generating unit to provide an output force to said power generating unit, the output force being generated by increasing the input force; and increasing means, provided between said operating rod and said push rod, for increasing a rate of increase of the output force so that the rate of increase is increased as the input force is increased.

5. The brake apparatus as claimed in claim 4, wherein said increasing means comprises an elastic reaction disk engaging said push rod and a plunger engaging said operating rod, said reaction disk being pressed by an end of said plunger when the input force is supplied, a space being formed around said end of said plunger, said reaction disk protruding into said space when said reaction disk is pressed by said end of said plunger.

6. The brake apparatus as claimed in claim 5, wherein said space is formed by a recess having a bottom surface substantially parallel to a surface of said reaction disk, said bottom surface being a predetermined distance apart from said surface of said reaction disk.

7. The brake apparatus as claimed in claim 5, wherein said space is formed by a recess having a bottom surface having a taper extending toward said plunger.

8. A brake apparatus for a vehicle, comprising a link mechanism and a power generating unit generating a hydraulic pressure to each wheel of said vehicle, a pressing force being input through said link mechanism, a brake booster being provided between said link mechanism and said power generating unit to increase an input force input from said link mechanism to said power generating unit by operation of negative pressure generated in an air intake system of an engine provided in said vehicle, wherein said link mechanism comprising lever ratio changing means for changing a lever ratio of said link mechanism so that the lever ratio is gradually decreased as a pedal stroke is increased after the pedal stroke reaches a predetermined point, and said brake booster comprising increasing means for increasing a rate of increase of the output force so that the rate of increase is increased as the input force is increased, and wherein a brake characteristic of said brake apparatus is a linear relationship relative to the deceleration of said vehicle, said brake characteristic being defined as an inclination of the deceleration with respect to the pressing force input to said link mechanism.

9. The brake apparatus as claimed in claim 8, wherein said link mechanism comprises:

a brake pedal including a lever portion having a first end and a second end, a pedal provided on said first end, said lever portion being pivotally supported at a pivot point between said first and second ends;

a pivot link having a first end and second end, said second end of said pivot link connected to a force transmission member connected to said power generating unit, said pivot link being pivotally supported at a pivot point between said first and second ends of said pivot link; and a connection link having a first end and a second end, said first end of said connection link connected to said second end of said lever portion of said brake pedal, said second end of said connection link connected to said first end of said pivot link, wherein travel of said pedal of said brake pedal is transmitted to said force transmission member via said connection link so that a lever ratio of said link mechanism is changed while said pedal travels from an initial position to a stroke end position, said lever ratio defined as a ratio of a rate of change in movement of said pedal to a rate of change in movement of said force transmission member, and said brake booster comprises:

an operating rod connected to said link mechanism so that the input force is input from said link mechanism;

a push rod connected to said power generating unit to output the output force to said power generating unit, the output force being generated by increasing the input force: and an elastic reaction disk material engaging said push rod and a plunger engaging said operating rod, said reaction disk being pressed by an end of said plunger when the input force is supplied, a space being formed around said end of said plunger, said reaction disk protruding into said space when said reaction disk is pressed by said end of said plunger, said space being formed by a recess having a bottom surface with a taper toward said plunger.

10. The brake apparatus as claimed in claim 8, wherein said link mechanism comprises:

a brake pedal including a lever portion having a first end and a second end, a pedal provided on said first end, said lever portion being pivotally supported at a pivot point between said first and second ends;

a pivot link having a first end and second end, said second end of said pivot link connected to a force transmission member connected to said power generating unit, said pivot link being pivotally supported at a pivot point between said first and second ends of said pivot link; and a roller rotatably supported at said first end of said pivot link, said roller engaging a surface of said lever portion of said brake pedal between said second end and said pivot point of said brake pedal, wherein travel of said pedal of said brake pedal is transmitted to said force transmission member via said roller and said pivot link so that a lever ratio of said link mechanism is changed while said pedal travels from an initial position to a stroke end position, said lever ratio defined as a ratio of a rate of change in movement of said pedal to a rate of change in movement of said force transmission member.

11. The brake apparatus as claimed in claim 10, wherein said brake booster comprises:

an operating rod connected to said link mechanism so that the input force is input from said link mechanism;

a push rod connected to said power generating unit to output the output force to said power generating unit, the output force being generated by increasing the input force: and an elastic reaction disk engaging said push rod and a plunger engaging said operating rod, said reaction disk being pressed by an end of said plunger when the input force is supplied, a space being formed around said end of said plunger, said reaction disk protruding into said space when said reaction disk is pressed by said end of said plunger, said space being formed by a recess having a bottom surface with a taper toward said plunger, said end of said plunger having a tapered surface.

* * * * *